Figure 1:
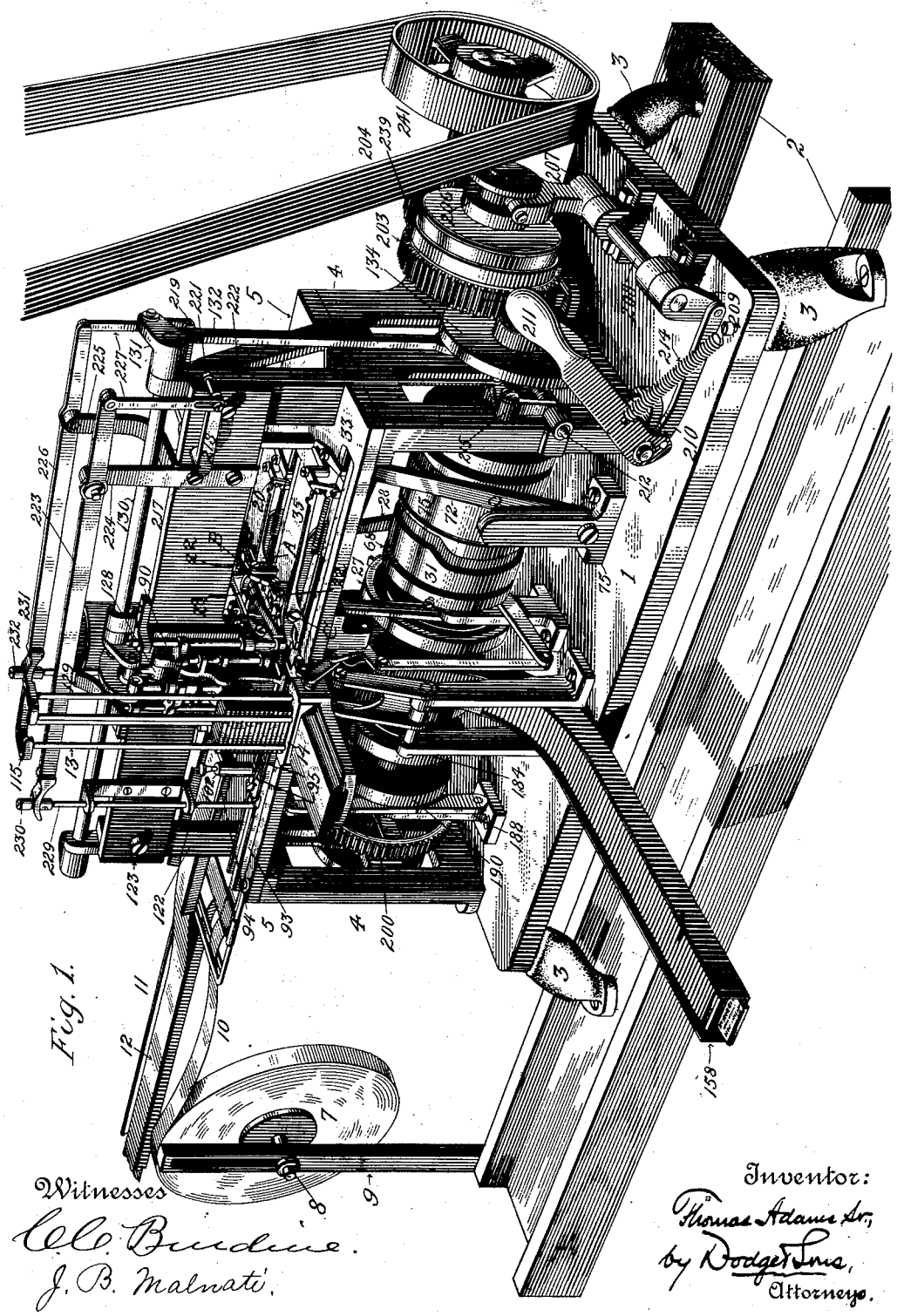

No. 829,684. PATENTED AUG. 28, 1906.
T. ADAMS, Sr., DEC'D.
J. D., T. & M. E. ADAMS, EXECUTORS.
WRAPPING MACHINE.
APPLICATION FILED AUG. 31, 1900.

17 SHEETS—SHEET 1.

Witnesses
C. C. Burdine.
J. B. Malnati.

Inventor:
Thomas Adams Sr.,
by Dodge & Sons,
Attorneys.

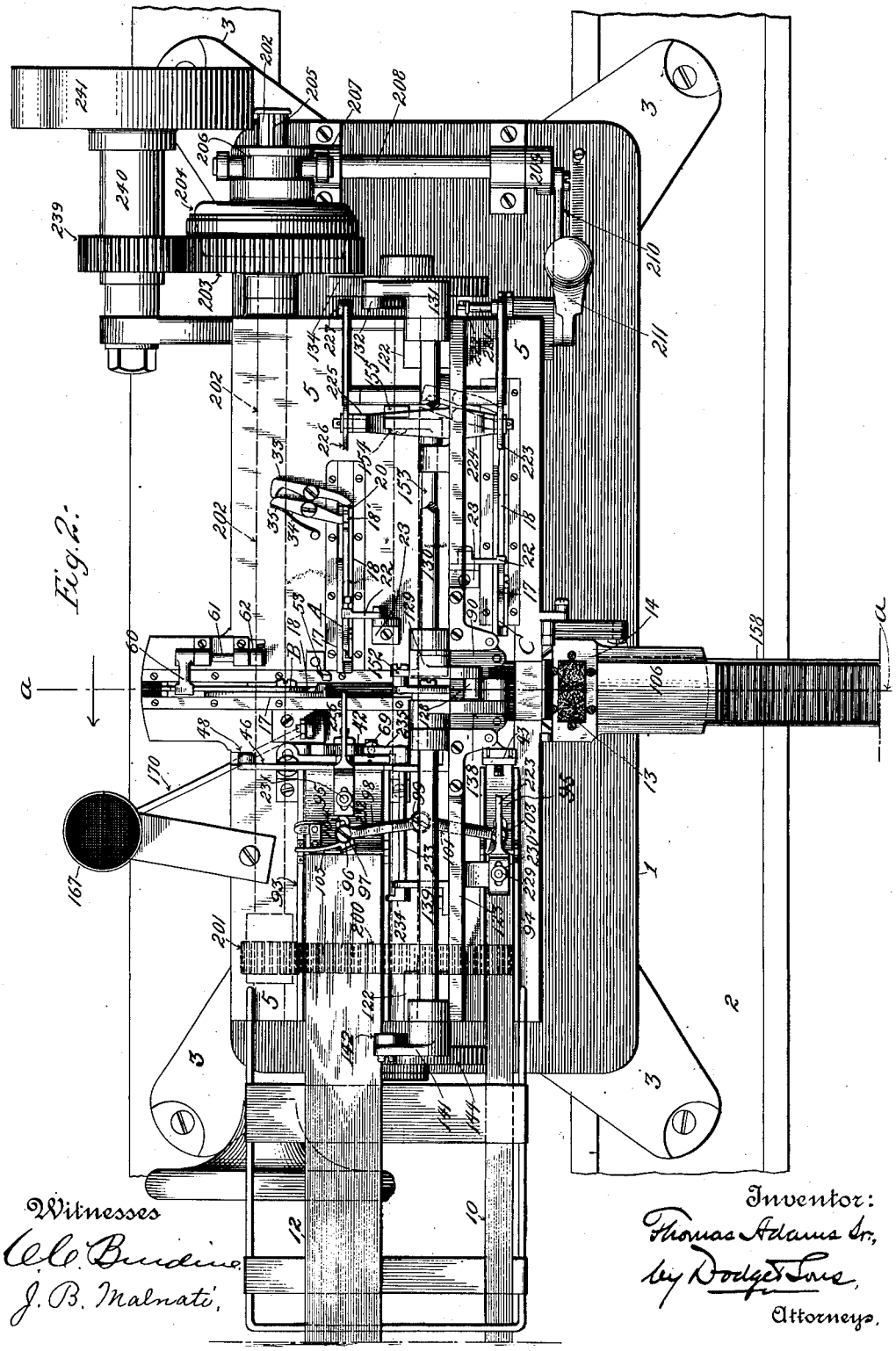

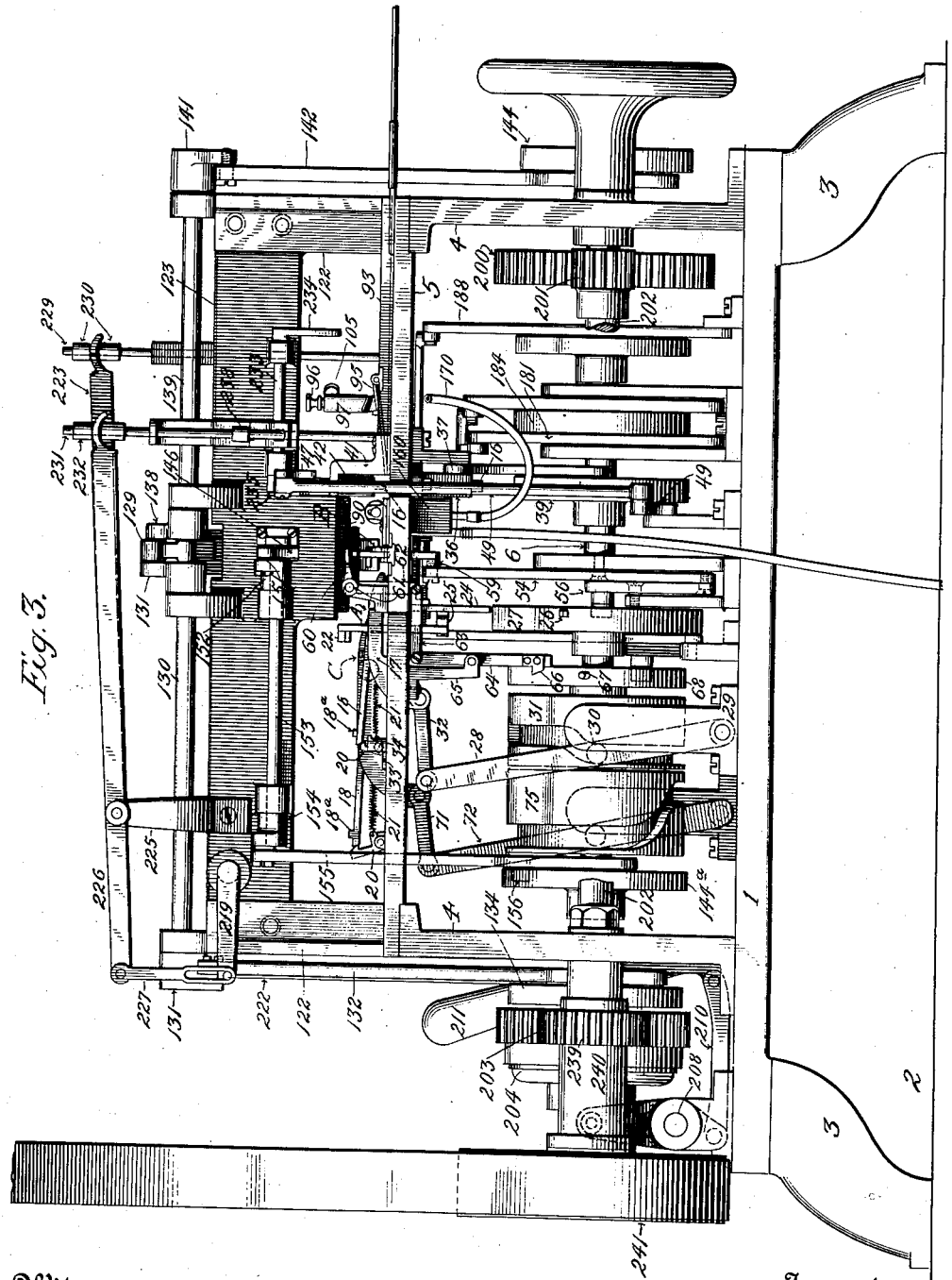

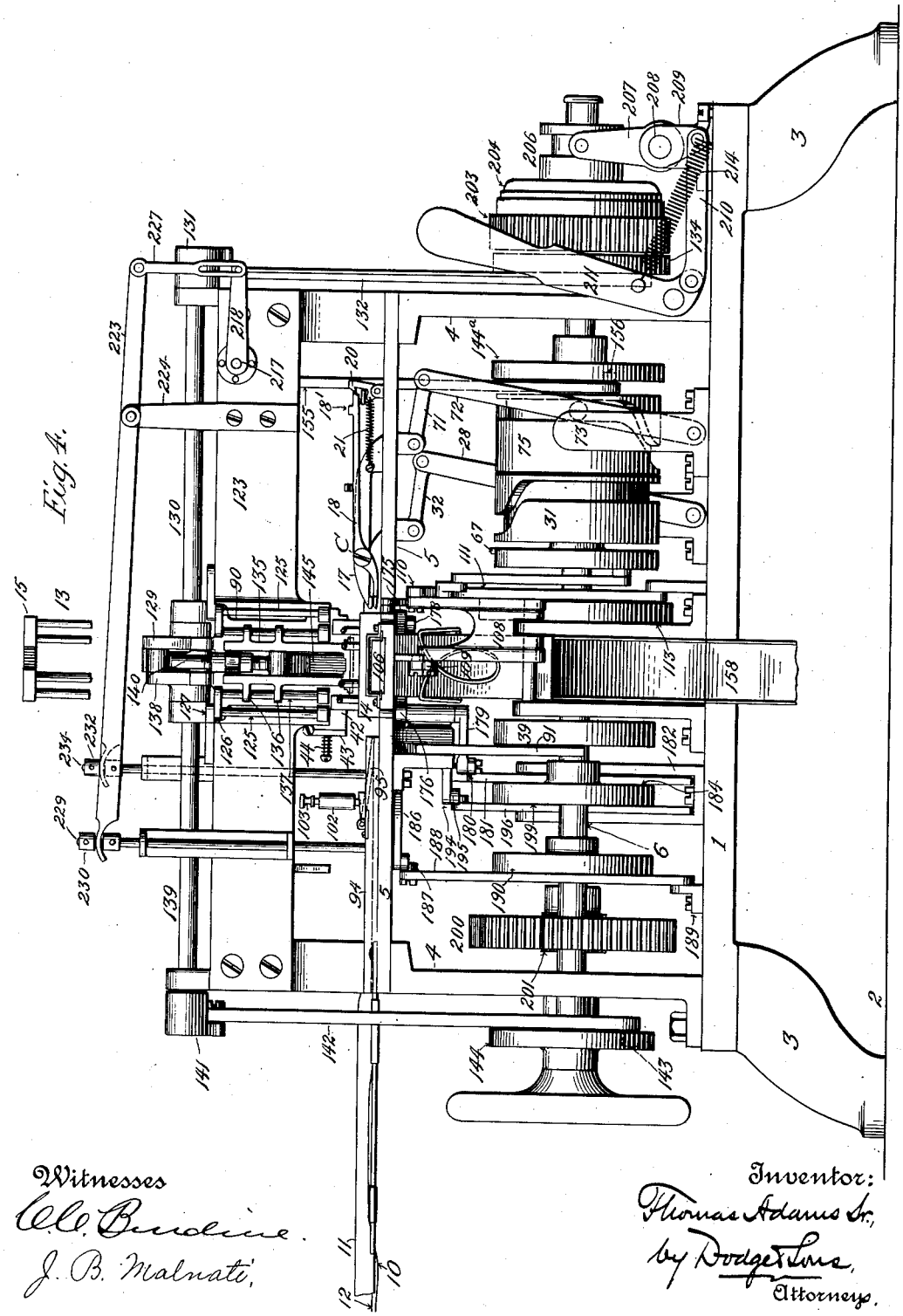

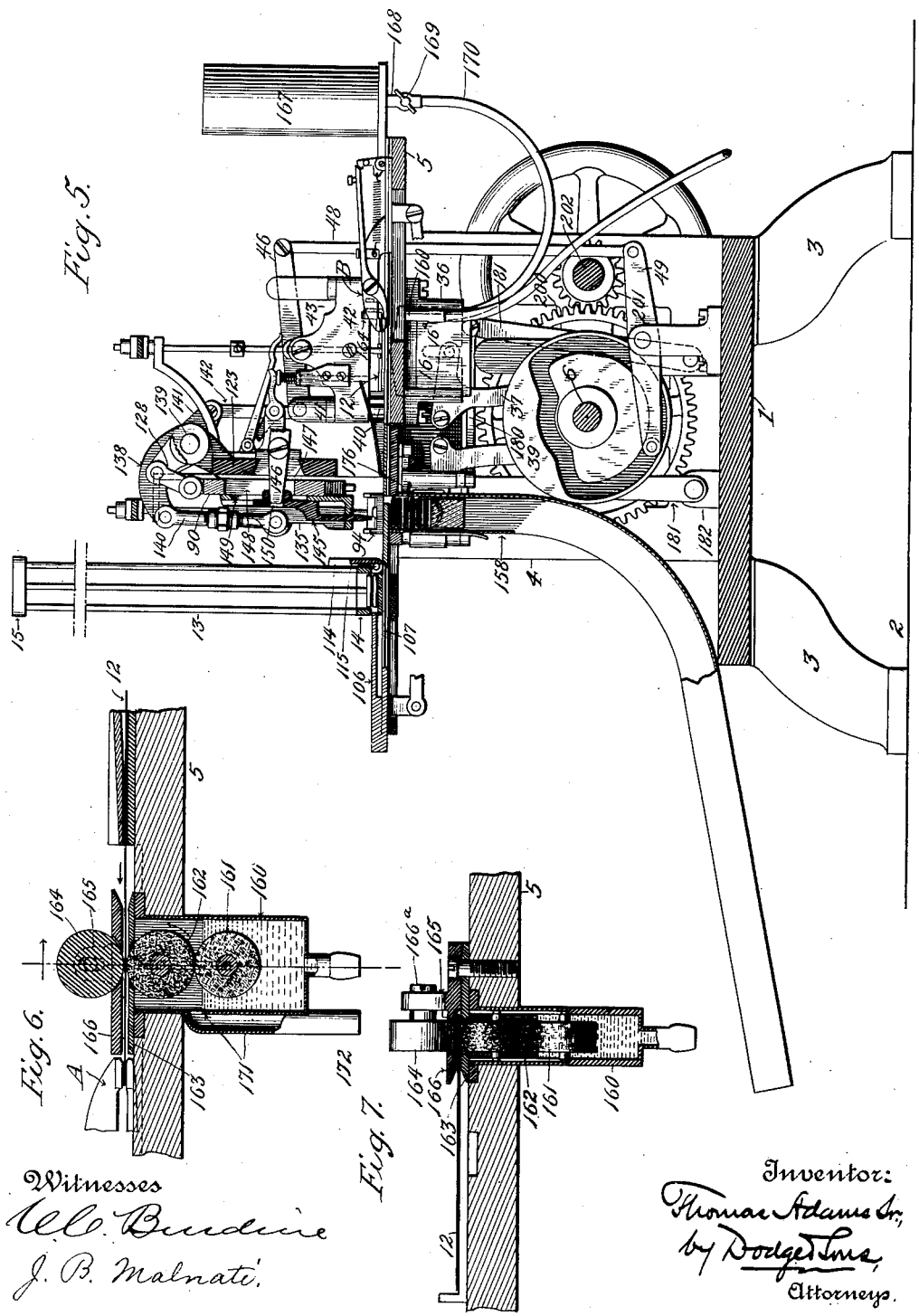

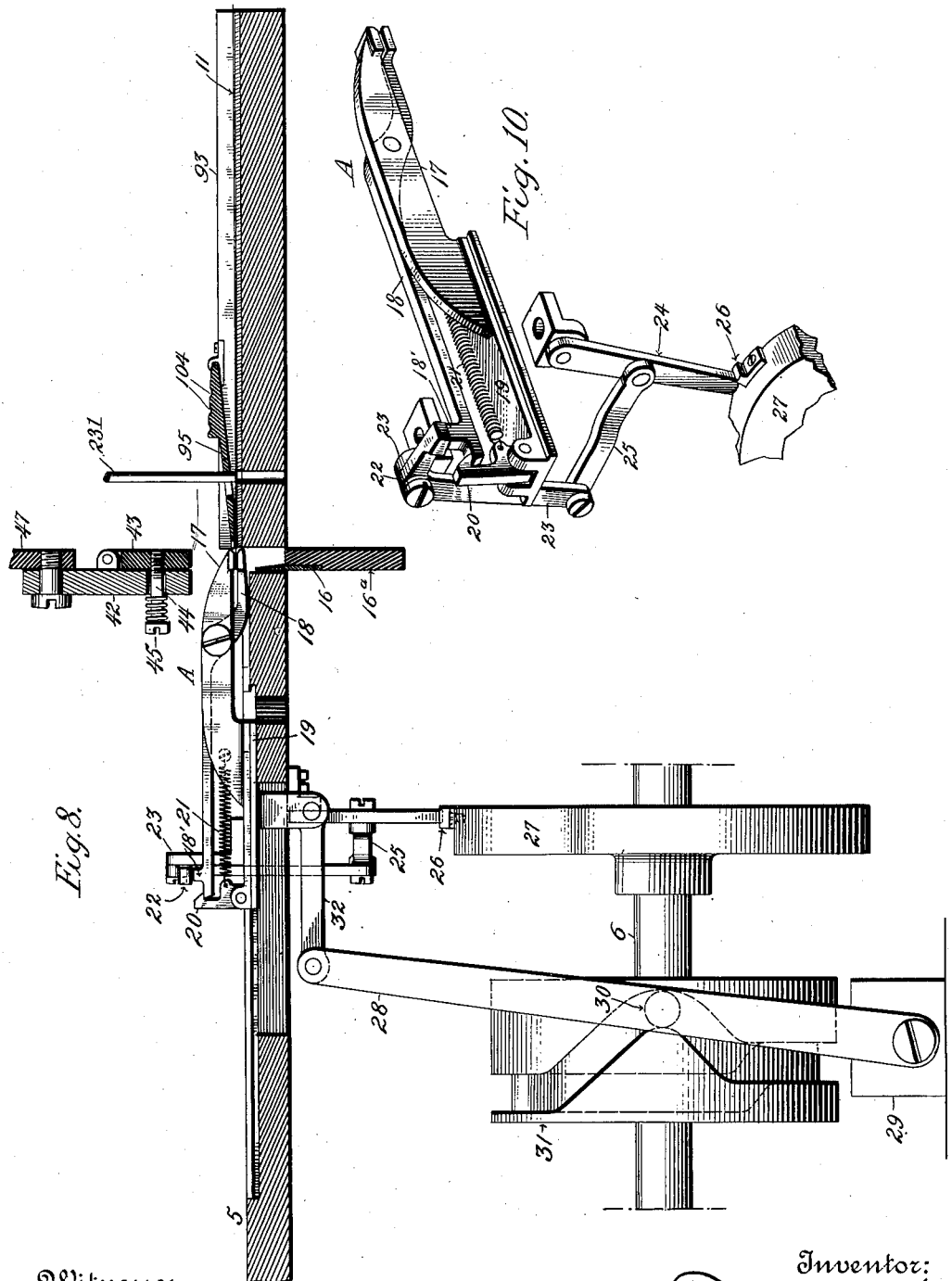

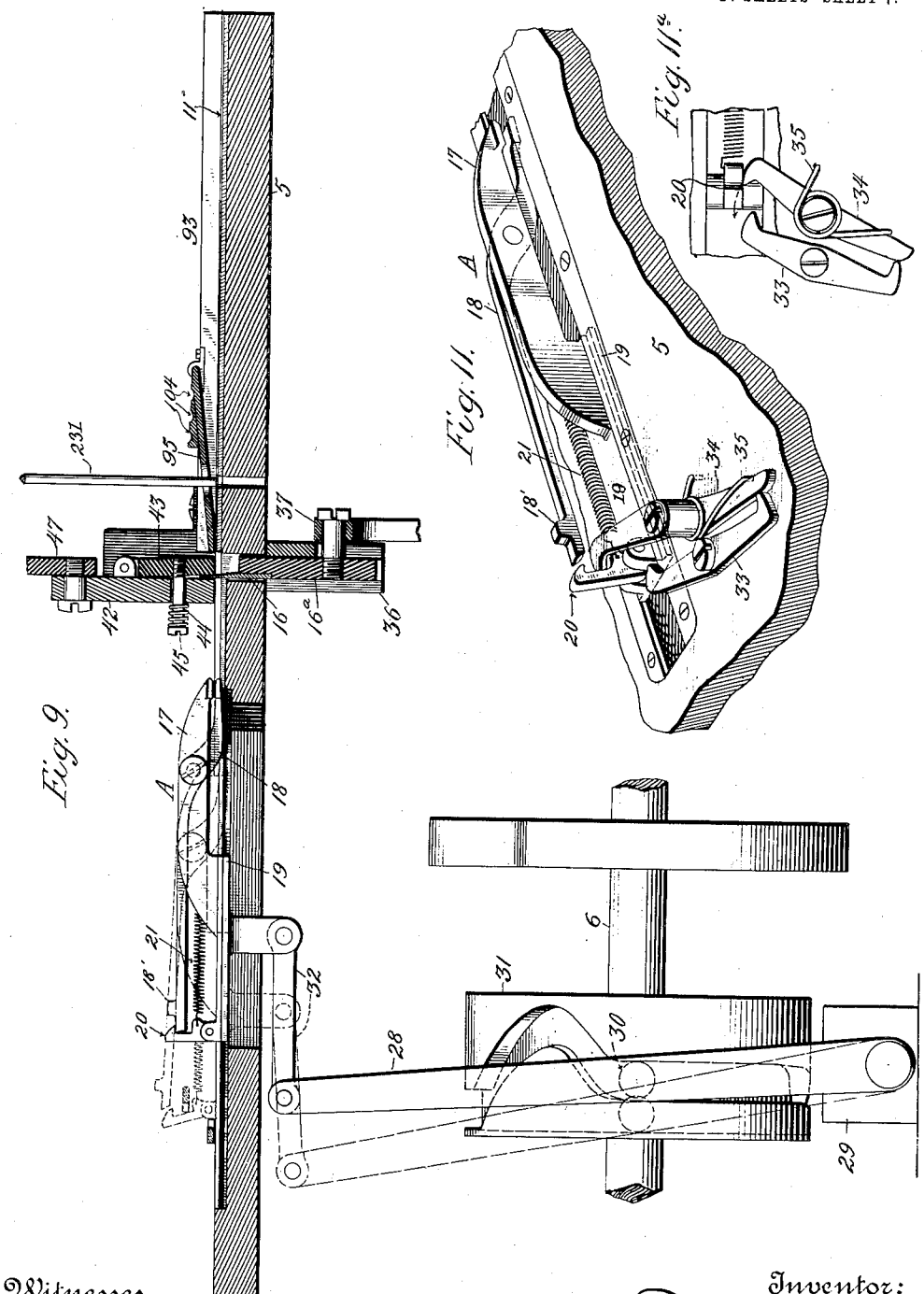

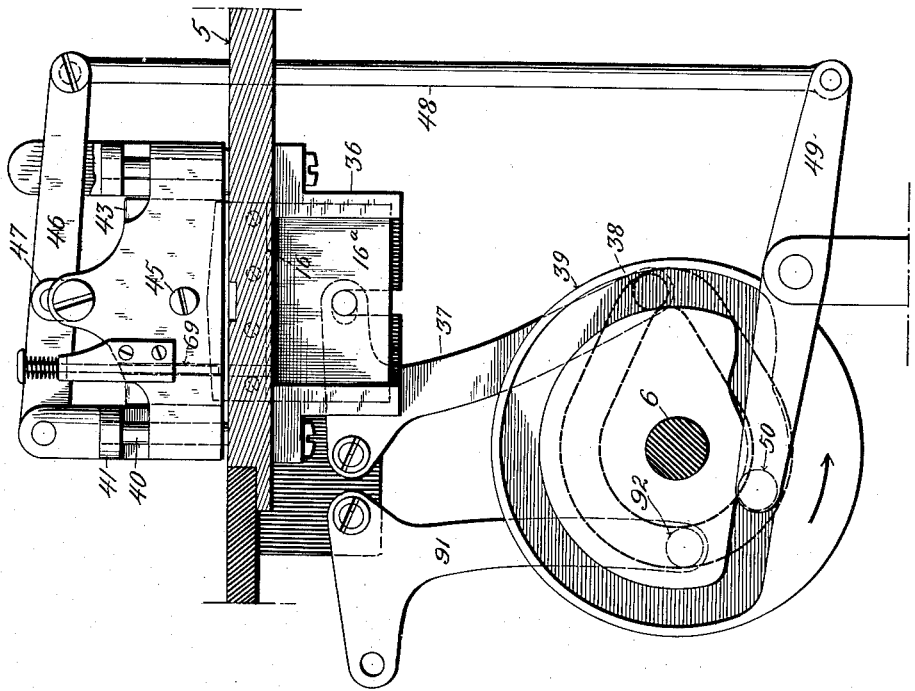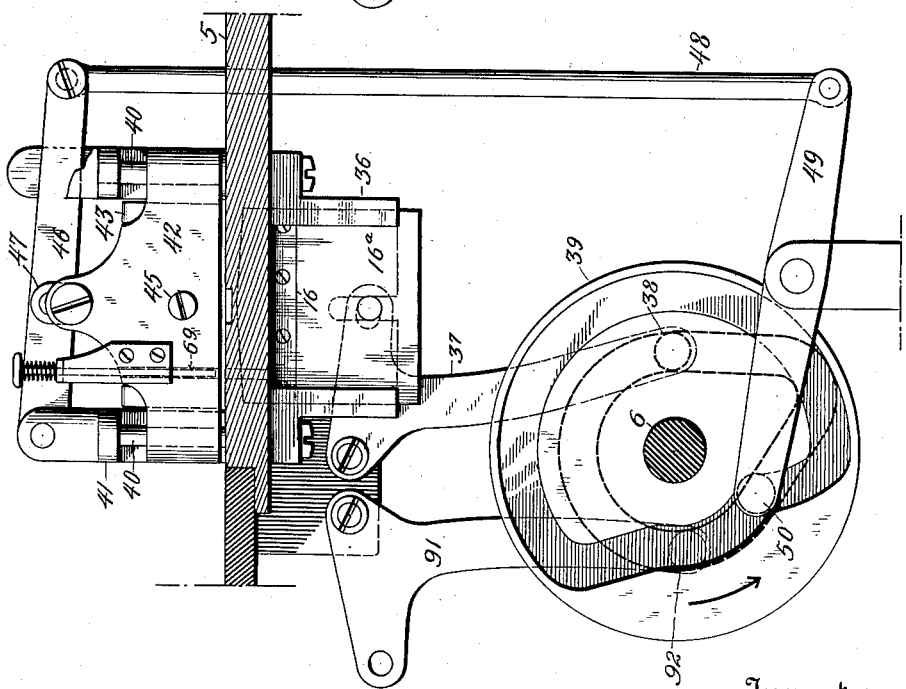

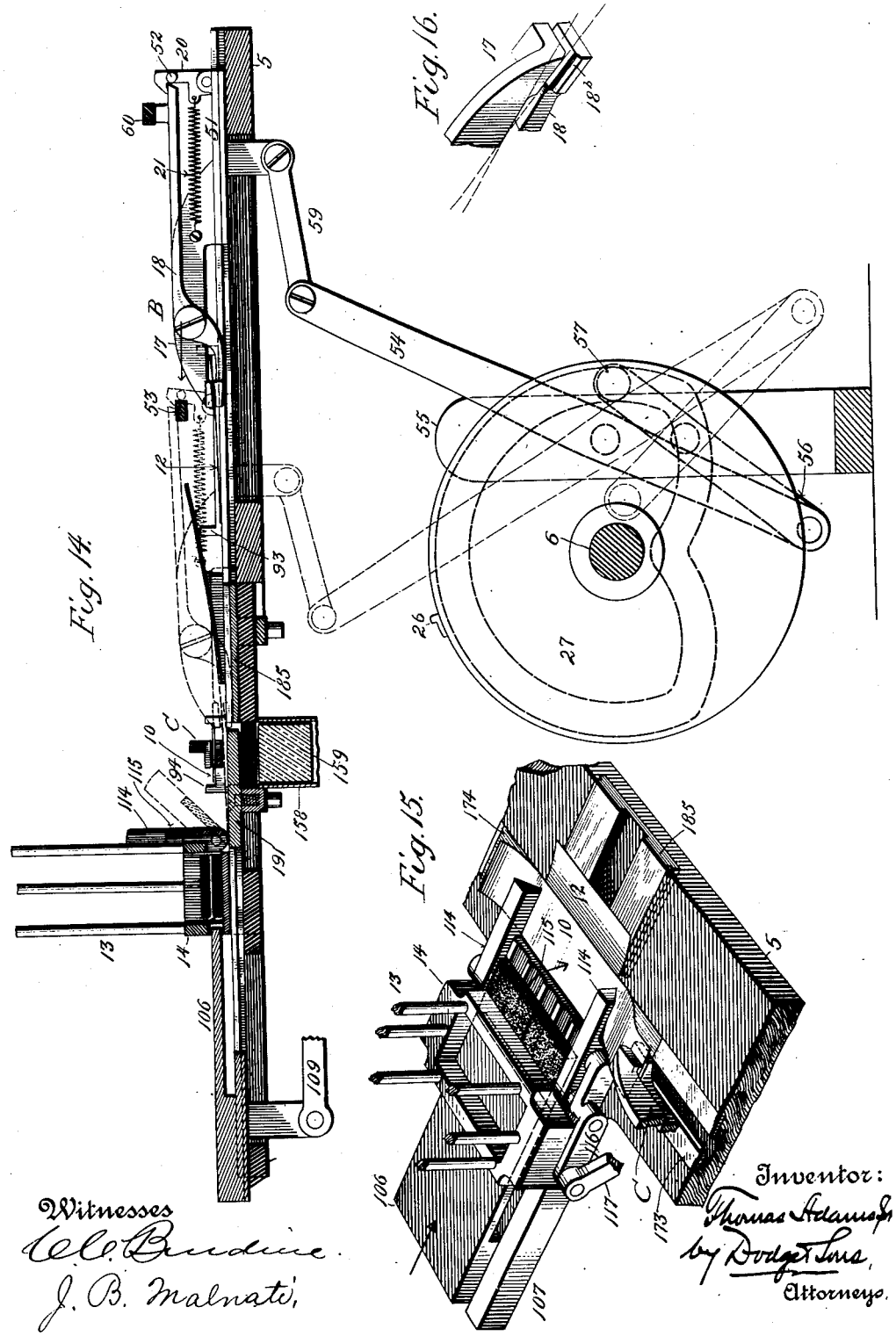

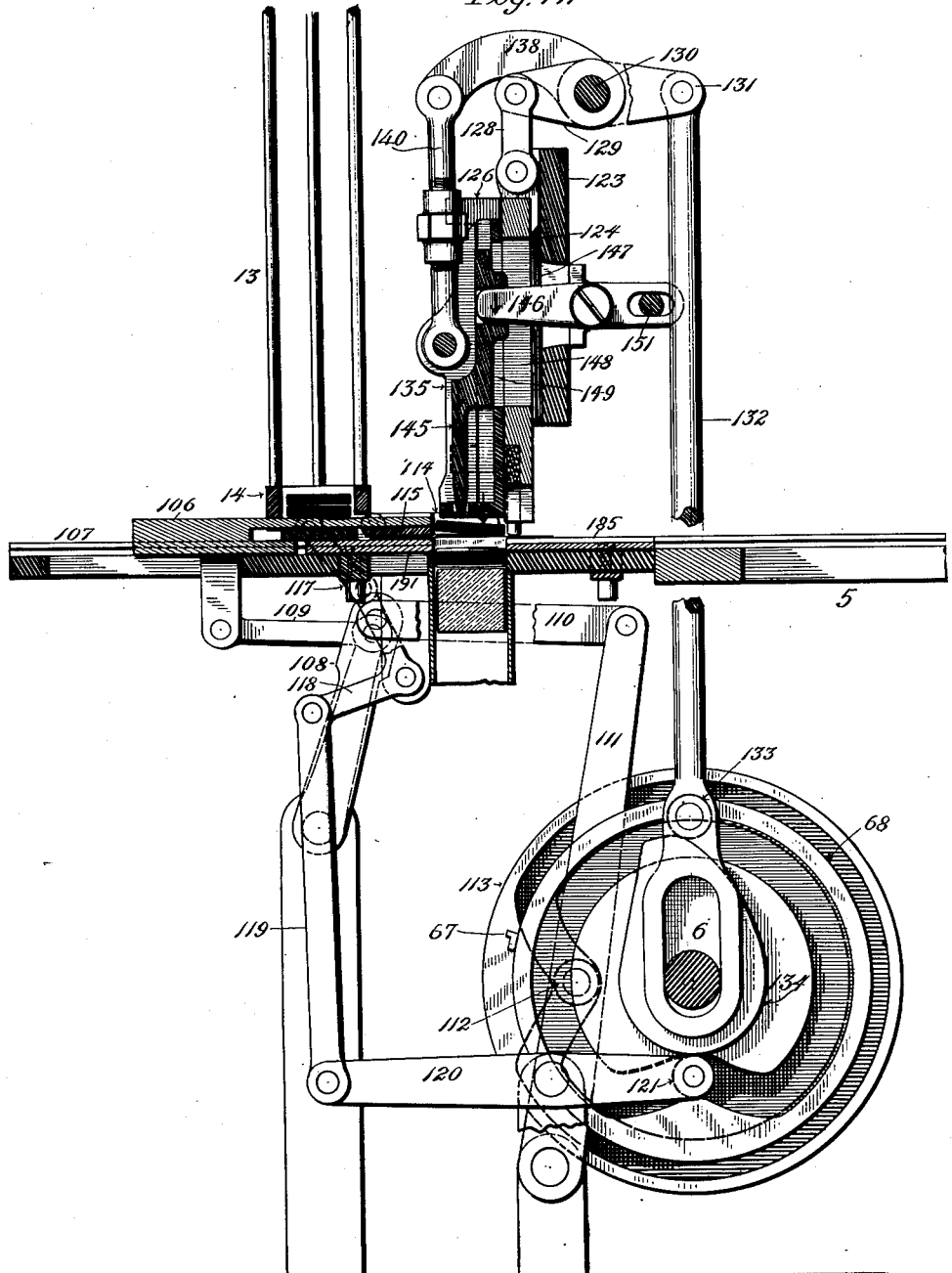

No. 829,684. PATENTED AUG. 28, 1906.
T. ADAMS, Sr., DEC'D.
J. D., T. & M. E. ADAMS, EXECUTORS.
WRAPPING MACHINE.
APPLICATION FILED AUG. 31, 1900.
17 SHEETS—SHEET 11.
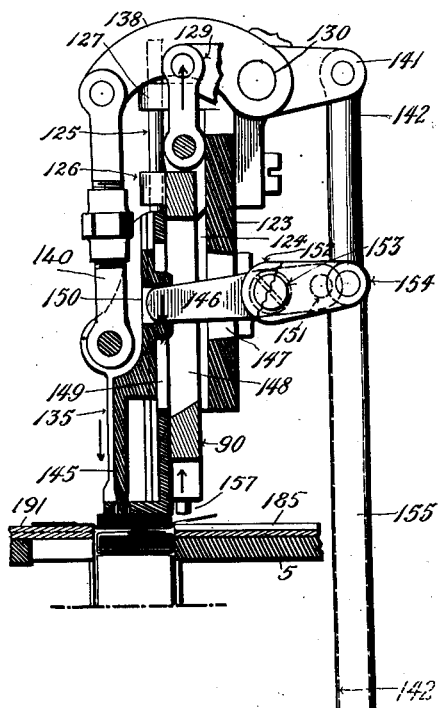
Fig. 18.
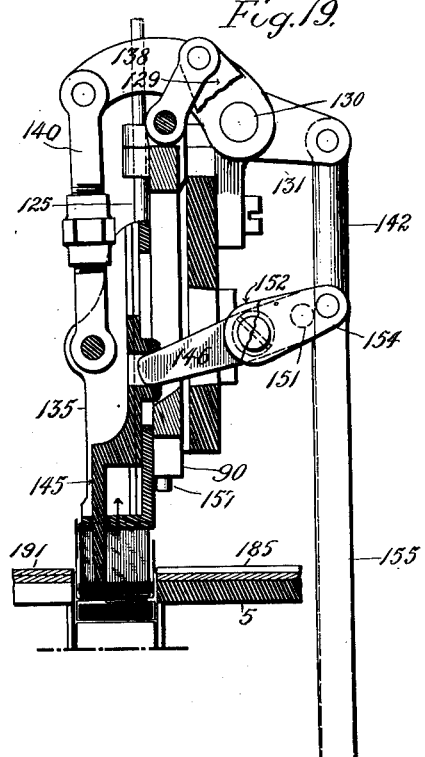
Fig. 19.
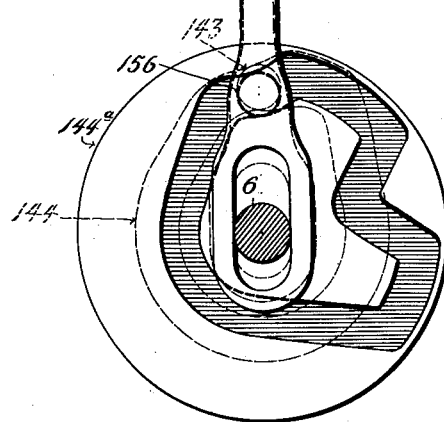
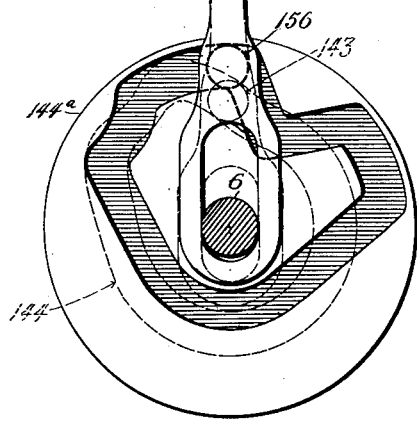
Witnesses
Inventor:
Thomas Adams Sr.,
by Dodge & Sons,
Attorneys.

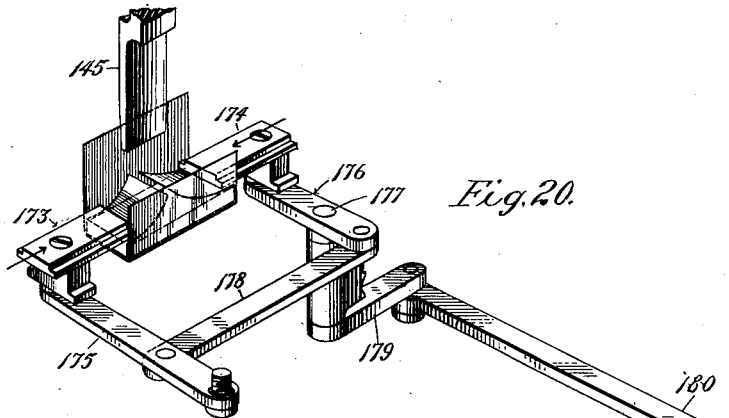
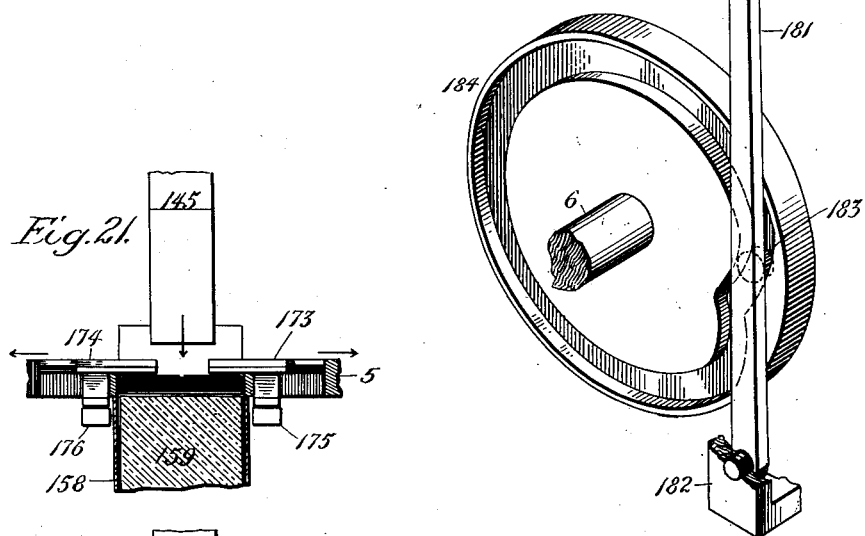
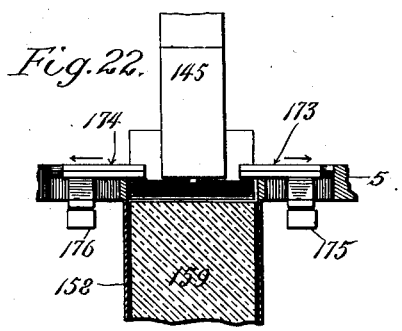

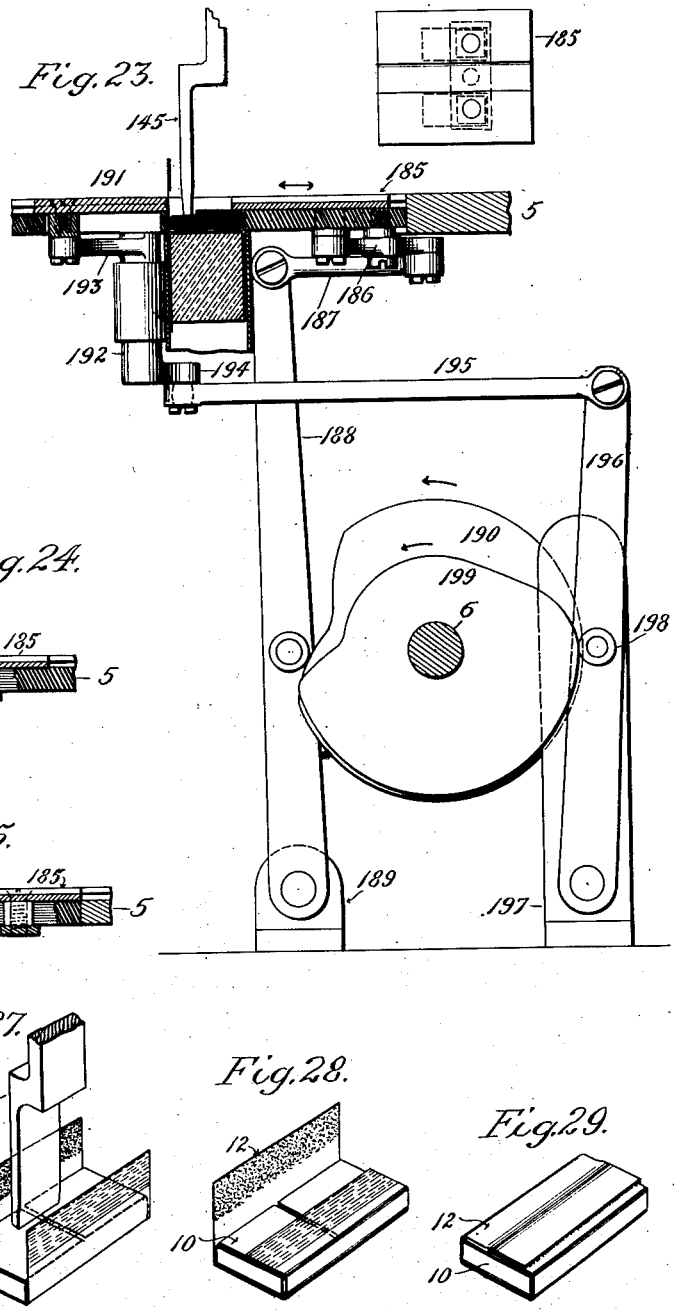

No. 829,684. PATENTED AUG. 28, 1906.
T. ADAMS, Sr., DEC'D.
J. D., T. & M. E. ADAMS, EXECUTORS.
WRAPPING MACHINE.
APPLICATION FILED AUG. 31, 1900.
17 SHEETS—SHEET 14.
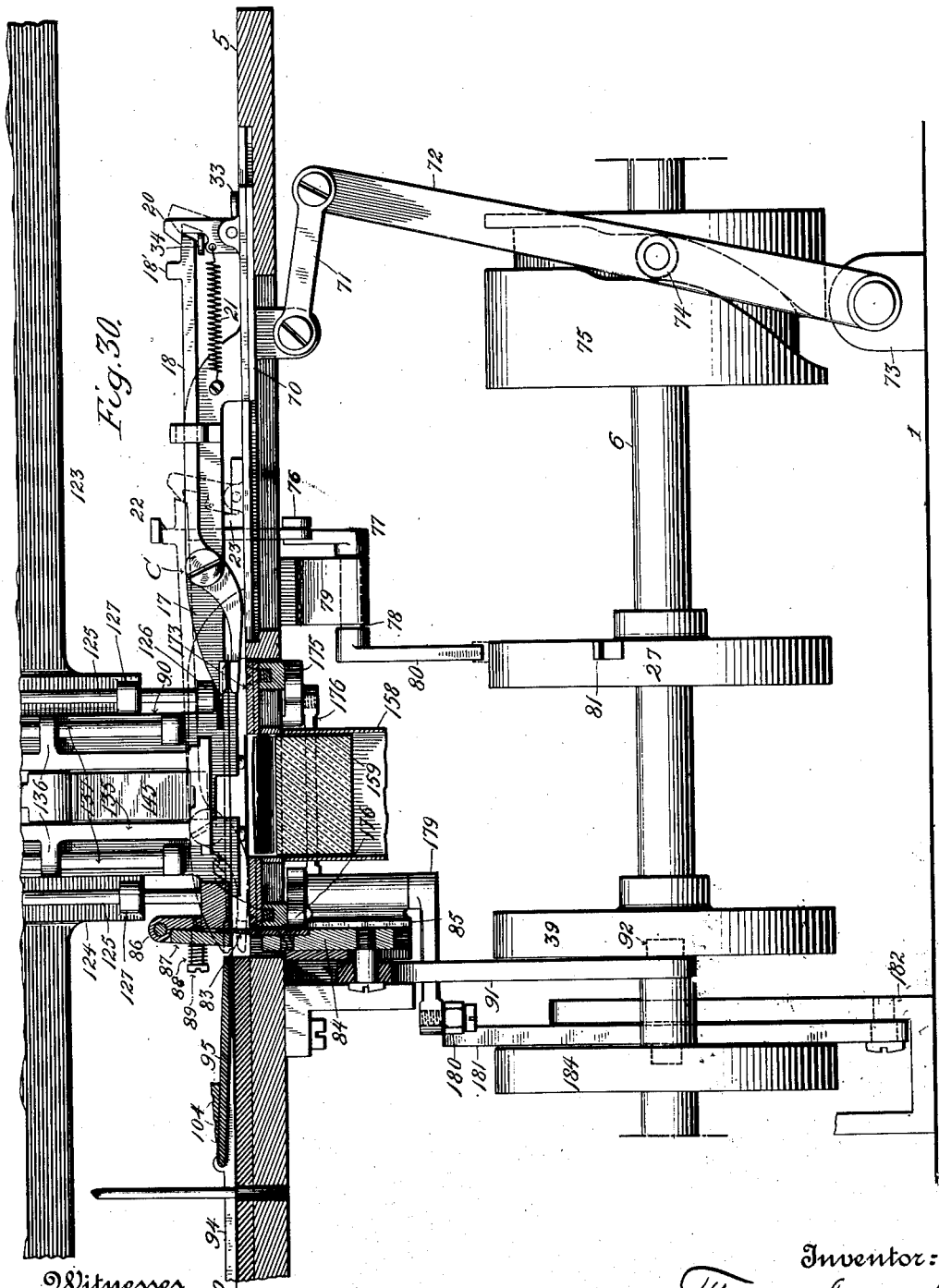

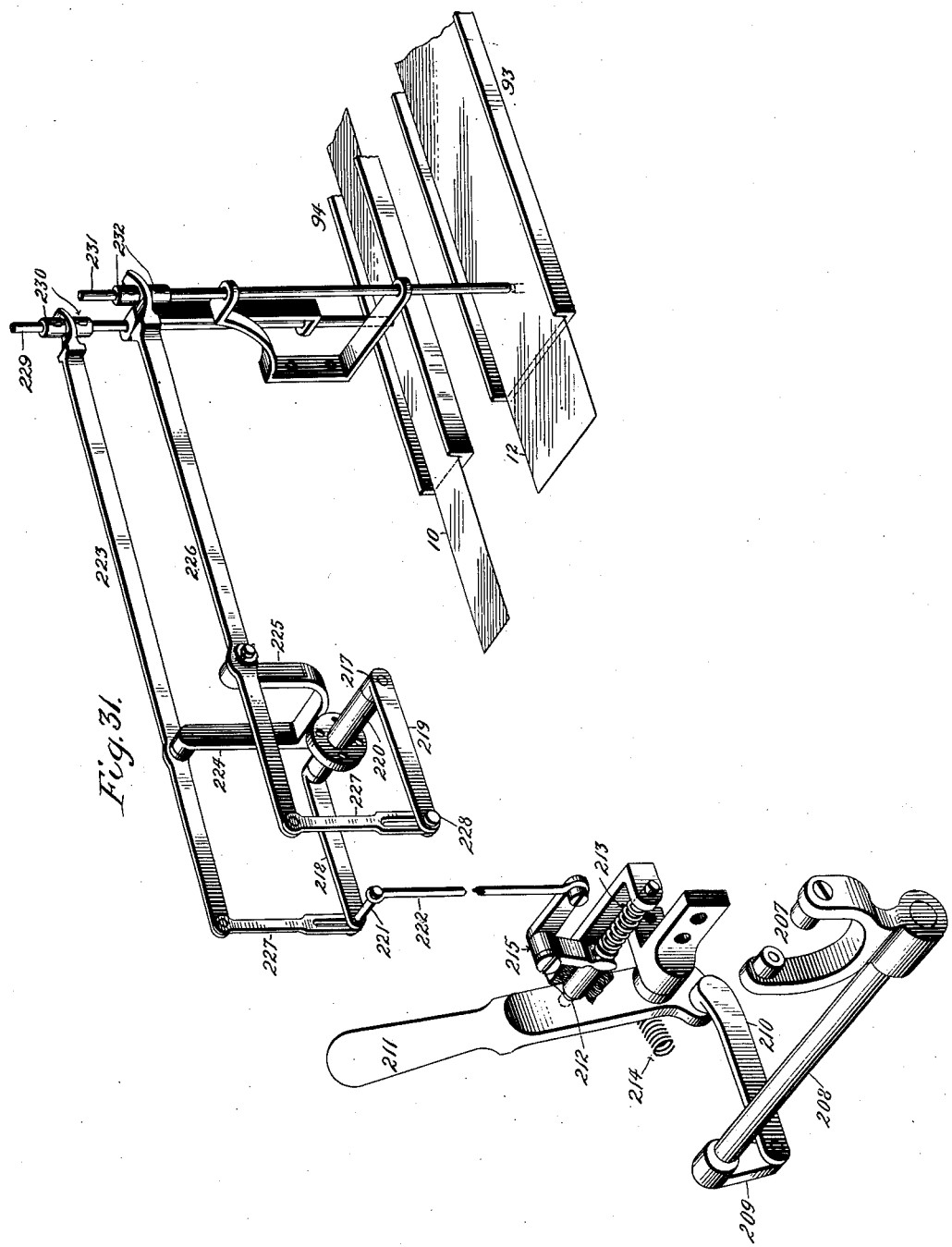

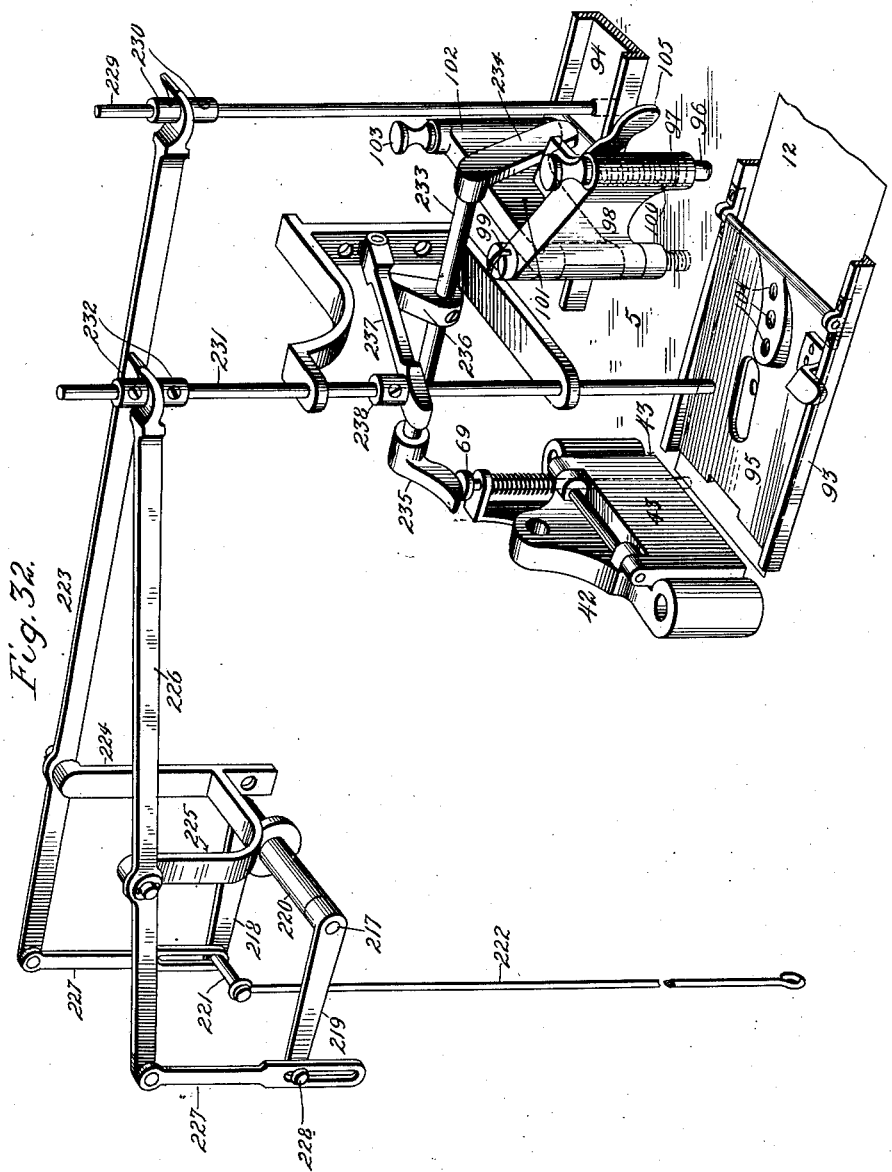

No. 829,684. PATENTED AUG. 28, 1906.
T. ADAMS, Sr., DEC'D.
J. D., T. & M. E. ADAMS, EXECUTORS.
WRAPPING MACHINE.
APPLICATION FILED AUG. 31, 1900.
17 SHEETS—SHEET 17.
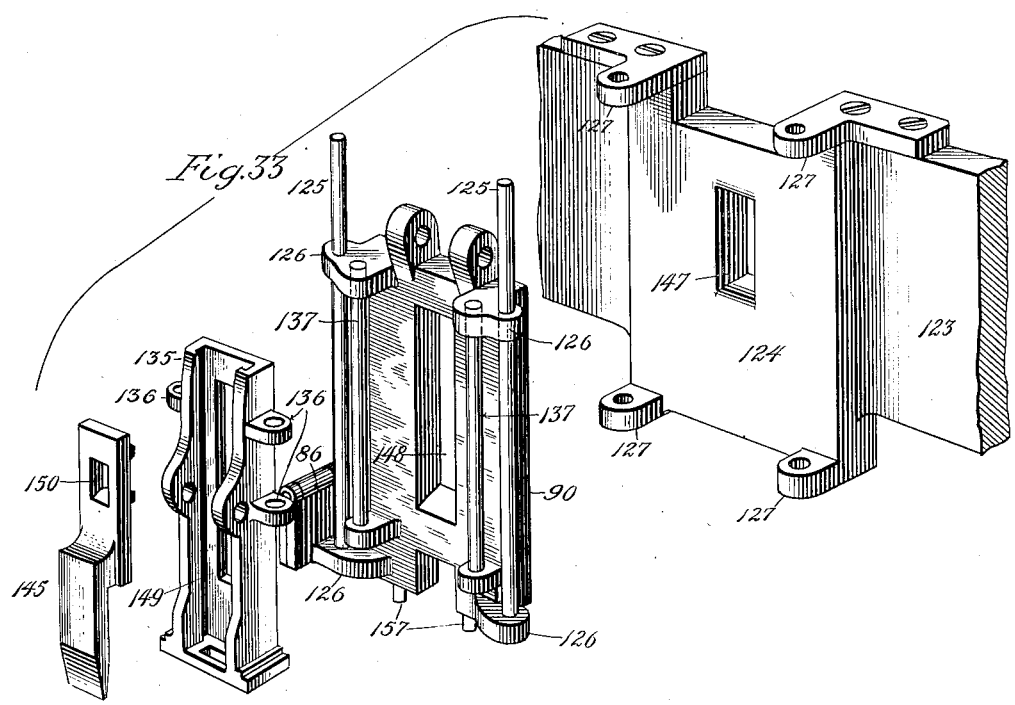
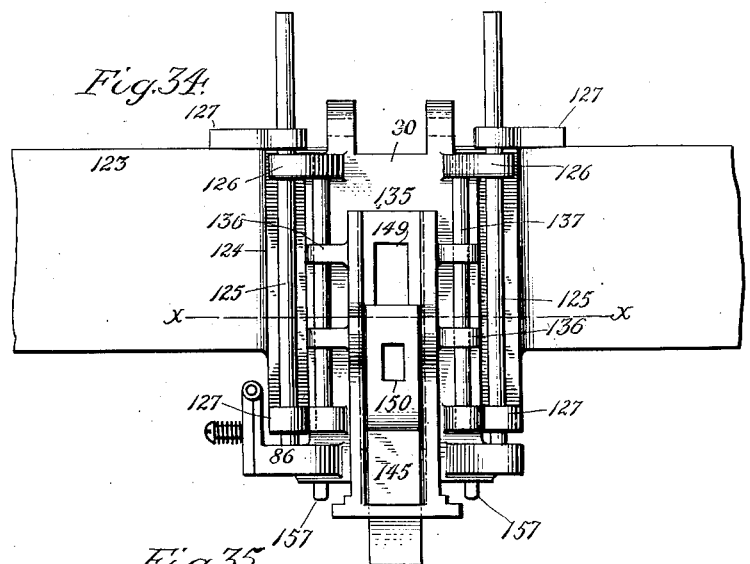
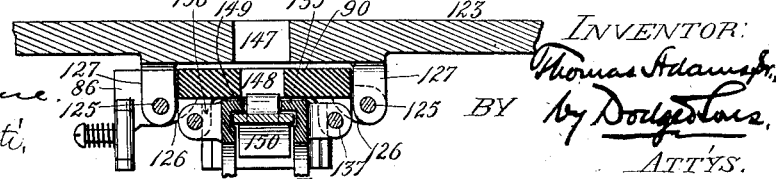

UNITED STATES PATENT OFFICE.

THOMAS ADAMS, SR., OF BROOKLYN, NEW YORK; JOHN D. ADAMS AND THOMAS ADAMS, OF BAY SHORE, NEW YORK, AND MARTHA E. ADAMS EXECUTORS OF SAID THOMAS ADAMS, SR., DECEASED.

WRAPPING-MACHINE.

No. 829,684.　　　　　Specification of Letters Patent.　　　　Patented Aug. 28, 1906.

Application filed August 31, 1900. Serial No. 28,676.

*To all whom it may concern:*

Be it known that I, THOMAS ADAMS, Sr., a citizen of the United States, residing at Brooklyn, in the county of Kings and State of New York, have invented certain new and useful Improvements in Wrapping-Machines, of which the following is a specification.

My invention pertains to machinery for wrapping gum, chocolate, and the like, and has for its object the mechanical application of two wrappers, one of paraffined paper and the other of ordinary paper bearing advertising or other printed matter.

The invention consists in a variety of novel features, details, and combinations hereinafter set out, whereby a simple, strong, and efficient machine is produced having large capacity and requiring but little power to operate it.

The construction and operation may be best explained in connection with the accompanying drawings, wherein—

Figure 1 is a perspective view of the machine looking at its delivery side, which may be regarded as its front and will be so designated in the following description; Fig. 2, a top plan view of the machine; Fig. 3, a rear elevation of the same; Fig. 4, a front elevation; Fig. 5, a vertical transverse section on the line *a a* of Fig. 2; Figs. 6 and 7, detail views of the mucilage-moistening mechanism; Fig. 8, an elevation of the gripper mechanism by which the wrapper-strip is drawn forward, and of the cutter by which successive wrappers are severed therefrom; Fig. 9, a similar view of said parts, but showing the strip drawn forward and the knife elevated as in the act of severing a wrapper; Fig. 10, a perspective view of the gripper and the mechanism for locking its jaws upon the wrapper-strip; Fig. 11, a view of the gripper, showing the trip in the act of releasing the lock to permit the jaws to separate; Fig. 11ª, a view of the trip in another position; Fig. 12, a cross-section showing in elevation the cutter and its actuating mechanism, with the clamping-block brought down upon and the cutter drawn down out of the path of the wrapping-strip; Fig. 13, a similar view, but showing the cutter raised as in the act of severing a wrapper from the strip; Fig. 14, a sectional view from front to rear of the machine, showing the gripper by which a severed wrapper is carried laterally to the point where it is crossed by an inner wrapper and where it receives the gum or body to be wrapped, the actuating mechanism being likewise shown and the parts being represented by full and dotted lines in their two positions; Fig. 15, a perspective view showing the relative positions of the inner and outer wrappers, the means for holding them, and the mechanism for delivering the gum or other body to them; Fig. 16, a perspective view showing the form of the ends of the transfer-gripper jaws; Fig. 17, a transverse vertical section illustrating the operation of pressing down the gum into its wrappers and of setting the previously-pasted wrapper; Figs. 18 to 25, inclusive, views illustrating the operations of folding the wrapper about the gum or other body and showing the mechanism by which the several operations are performed; Figs. 26 to 29, inclusive, perspective views showing the progressive formation of the package apart from the mechanism by which it is formed; Fig. 30, a sectional view taken lengthwise of the machine, showing in elevation the grippers which seize and advance the inner-wrapper strip and the mechanism by which they are actuated, and also showing in section the cutter which separates successive wrapper-blanks from said strip; Fig. 31, a perspective view illustrating the automatic trip or throw-out mechanism by which the machine is thrown out of action when the paper is exhausted, also the manual throw-out; Fig. 32, a perspective view of portions of the same mechanism viewed from another point and showing also the gage or stop for determining the proper introduction of a fresh wrapper-strip; Fig. 33, a perspective view of the vertically-reciprocating cross-heads of the folding mechanism, showing the parts separated from one another; Fig. 34, a face view of said parts assembled; Fig. 35, a horizontal section on the line *x x* of Fig. 34.

The machine about to be described is primarily designed for wrapping gum and chocolate in the form of cakes, though it may be used for putting up merchandise of various kinds when brought to the proper form and dimensions or if the machine be made or adjusted to suit. As the construction and mode of operation will remain the same for any class of goods that may be handled by the machine, I shall simply preface the description by saying that two wrappers are used, the inner one being in the present instance of paraffined paper passed lengthwise about the goods and the other a printed wrapper passed about the same at right angles to the first and serving to bind in or hold in place the infolded ends of the first wrapper. It will of course be understood that while paraffined paper is here employed as one of the wrappers, this is in no sense essential, each wrapper being of such character as the circumstances of any given case demand or suggest. Thus one wrapper may be of paper and another of metal foil, or both may be of foil, or other material or combinations of material may be adopted.

Referring again to the drawings, the machine will be described in detail. As best shown in Fig. 1, where the machine is seen in perspective, it has a base-plate or bed 1 raised to a convenient height above its table or support 2 by short legs or feet 3, which are preferably screwed or otherwise made fast to the table or support to give steadiness to the machine and prevent it from being lifted or moved by the driving-belt.

From the base-plate or bed 1 rise two vertical plates or standards 4 4, which serve to support an upper bed or table 5, upon and above which are arranged most of the operative devices by which the wrapping operations are effected. Beneath the upper table 5 and between it and the bed or base-plate 1 extends a horizontal shaft 6, carrying a series of rotary cams by which the wrapping devices are actuated and their movements are timed.

It is to be observed that all the operative parts of the wrapping mechanism, including the feeding, cutting, pasting, folding, pressing, and ejecting devices, receive their power and motion from rotary cams carried by a single straight-line shaft, thus reducing to a minimum the power required for operating the machine, permitting a high rate of speed, preventing vibration or jar, and reducing the driving mechanism to a very simple form, while insuring and maintaining perfect timing of the parts. The principal devices involved in cutting, applying, and folding the wrappers are located upon the table 5, and the levers by which power and motion are transmitted to them from the cams reach upward through openings in the table.

The paper of which the wrappers are made may be cut to size and fed in piece by piece or cut from strips of a length sufficient to produce a limited number of blanks, or they may be cut from a strip of great length wound upon a reel. In practice I find it convenient to make use of a long strip of the paraffined paper, but to cut the outer wrapper from a strip of moderate length or to have them wholly separated before supplying them to the machine. I shall here describe the outer wrapper as cut from a strip comprising about a dozen or fifteen wrappers, it being found convenient to print the strips in this length.

In Fig. 1 I have shown a reel 7, carried by an axle 8, adjustably clamped or secured in a slotted post 9 and serving to carry the strip 10, from which are cut the inner-wrapper blanks, and I have further shown a trough or guideway 11, in which are placed, one after another, the strips 12. The two strips extend lengthwise of the machine and parallel to each other and are periodically drawn forward and subjected to the action of cutters which sever the blanks. The blanks are laid one upon the other, and the gum or other merchandise is laid upon them, after which the blanks are folded about the gum and secured.

The relative positions and arrangement of the wrapper-strips will be readily understood upon reference to Figs. 1 and 2, which show also the gum-magazine 13 and the feeding and cutting devices.

*The gum-magazine.*—The magazine 13 consists of a series of parallel vertical rods or wires, (six being shown in the drawings,) the lower ends of which are screwed or otherwise secured in a block or base-piece 14, located at the front of the table 5 and just above the level thereof, their upper ends being connected and held in proper position by a frame 15. The frame 15 is open at the forward side to afford ready access to the goods contained in the magazine and to permit them to be loosened or straightened in the event of their becoming jammed or lodged.

The devices for feeding or delivering the gum, chocolate, or goods from the magazine will be explained after pointing out the mode of feeding the wrapper-strips, severing the blanks therefrom, and placing the two blanks one upon the other in position to receive the goods.

*Outer wrapper.*—The strip 12, from which are cut the outer wrappers, is laid in the trough-like guide 11, Fig. 1, and its forward end is advanced until it comes even with the blade 16 of the cutter, by which the blanks are severed from the strip, said cutter being seen in Figs. 5, 8, and 9. The cutting device as a whole will be described in its appropriate place. As one blank after another is severed the blade serves as a stop or gage for the strip, determining the point from which it will be drawn forward, and as the advance is effected by nippers having a prescribed and unvarying range of travel it is apparent that all blanks severed will be of precisely the same size.

*Outer-wrapper nippers.*—The nippers by which the outer-wrapper blank is advanced are shown in Figs. 1, 2, and 3 and on a larger scale in Figs. 8, 9, 10, and 11, Figs. 8 and 9 showing also the construction of the cutter and its relation to the nippers. Fig. 9 shows the cutter in its elevated position, with the parts in the positions they occupy when the blade has just severed a blank from a strip previously carried past the cutter.

The nippers A comprise two members 17 and 18, the member 17 being a rigid member made integral with or suitably secured to a slide 19 and the member 18 being a lever of the first order, pivoted or fulcrumed upon the fixed member 17. The forward ends or jaws of the members 17 and 18 are broadened out to form flat plate-like gripping-surfaces, as seen in Figs. 10 and 11, so that they may grasp the wrapper-strip firmly, but without liability of cutting, tearing, or buckling the same in the act of drawing it forward.

The rear arm of the lever or member 18, which extends a considerable distance from the fulcrum or pivot, has its extremity beveled, as shown in Figs. 8, 9, 10, and 11, to enable it to ride down in front of and to force back a hook or catch 20, pivoted upon the slide 19 and drawn toward the end of member 18 by a spring 21. The purpose of the hook or catch 20 is to hold the jaws of the pincers in their closed or gripping relation, as illustrated in Figs. 8, 9, and 10, to prevent accidental or premature release of the wrapper-strip. When the nippers go forward to seize the wrapper-strip, the jaw of member 18 is separated slightly from jaw or member 17, as seen in Fig. 11, to permit the strip to enter readily between them. This separation may be effected by a spring or by gravity, the jaw end of the member 18 being made enough heavier than the other end to secure proper opening. At the moment that the nippers advance to seize the wrapper-strip the cutter-blade 16 is withdrawn below the level of the bed or table 5, leaving the end of said strip, which protrudes beyond the end of the trough or guide 11 a short distance, free to be reached and seized by the nippers. After the open nippers advance to the position indicated in Fig. 8, where their jaws pass, respectively, above and below the projecting end of the wrapper-strip 12, they are closed upon the strip by the overhanging horizontal arm of an elbow-lever 22, Figs. 1, 2, 8, and 10. Lever 22 is fulcrumed upon a standard 23, secured to the bed or table 5 in such position as to cause the lever to overhang the rear end of member 18 of the nippers when the latter are at the extreme of their advance or forward travel. It is found advisable to form a raised stud 18' upon the lever or member 18 for the lever 22 to bear upon; but this is not essential.

The mechanism for actuating the elbow-lever 22 is illustrated in Figs. 8 and 10 and comprises a pendulous lever 24, fulcrumed to a block or stud on the under side of table or bed 5 and connected by a link 25 to the lower end of the vertical arm of lever 22, the lower extremity of pendulous lever 24 being arranged in the path of a stud or block 26, carried upon the periphery of a wheel or disk 27, mounted upon the main shaft 6, as seen in Figs. 8 and 10. Under the arrangement shown all parts of the apparatus operate once in each revolution of the main shaft, and there is consequently one block 26 on the periphery of the wheel; but obviously it may be duplicated if the other parts be made to repeat their operations in a single revolution, as may of course be done by properly shaping the actuating-cams. The wrapper-strip 12 being seized by the nipper-jaws and said jaws being locked by the hook 20, engaging lever 18, the slide 19, upon which the nippers are mounted, is moved outward or away from the cutter-blade 16 a distance exactly equal to the length or measurement of the blank required to produce the outer wrapper. This movement is effected by a lever 28, fulcrumed at its lower end to a block or lug 29 on the base-plate 1 and provided with a stud or bowl 30, which enters the peripheral cam-groove of a cam-wheel 31, the upper end of the lever being connected with slide 19 by a link 32, as seen in Figs. 8 and 9. Cam-wheel 31 is carried upon shaft 6.

*Outer-wrapper-nipper release.*—It is desirable to check the outward throw of the slide 19 and its nippers, and it is of course necessary to withdraw the hook or catch 20 in order to permit the nipper-jaws to separate and to release the wrapper-strip 12. To accomplish this double purpose, I provide what I term the "nipper-release" or "trip," which is illustrated in Figs. 1, 2, 11, and 11ª. This device comprises two levers 33 and 34, independently fulcrumed upon the upper table or bed 5 side by side, as shown in the several figures, and a spring 35, tending to swing the lever 34 about its pivot in the direction of travel of the hands of a clock. Lever 33 lies flat upon and close to the table 5, with one end overhanging the runway of the nipper-slide 19 and lying in the path of the lugs in which the hook 20 is pivoted, so that as said slide moves outward it shall engage the nose of said lever. Lever 34 has but one arm in plane with lever 33, and a second arm raised to a higher plane to pass above the lugs in which hook 20 is pivoted, as shown in Fig. 11 and by dotted lines in Fig. 9. Both ends of lever 33 and the end of the raised arm of lever 34 are fashioned into rounded bearing points or noses, which project laterally from the levers as shown. When the levers 33 34 are acted upon only by the spring 35, said spring turns lever 34 about its pivot or fulcrum, thereby throwing its outer end against the outer end of lever 33 and carrying the two levers to the positions shown in Fig. 11ª. Under this action lever 34 is carried out of the path of hook 20, which may therefore pass said lever 34 as the nippers move away from the cutter to advance the wrapper-strip 12. The inner end of lever 33 is always in the path of the lugs in which hook 20 is mounted or of some other portion of slide 19. Hence as said slide moves outward lever 33 is engaged and is swung about its pivot. As lever 33 thus moves, its outer end engages the outer arm of lever 34 and swinging said lever about its pivot carries the nose of its raised arm against the inner side of hook 20, thereby throwing back said hook and disengaging it from member 18 of the nippers, as shown in Fig. 11 and by dotted lines in Fig. 9. To render this action possible, it is of course necessary to properly proportion the levers 33 34 and correctly locate their pivots and bearing-points. In the drawings I have shown the raised arms of lever 34 as somewhat longer than the outer or lower arm and the lever 33 as bearing against lever 34 at a point somewhat inward from the end of the latter, thereby giving the extremity of the raised arm a longer sweep, and consequently a quicker movement than lever 33, which actuates it. In this way lever 34 is caused to move faster than slide 19 and its hook 20, though getting its motion primarily from said slide. Three pairs or sets of such nippers are used in the machine—the outer-wrapper-nipper, just described, the transfer-nippers, which seize the blank cut or to be cut from said wrapper and deliver it to the wrapping-point, and a third pair which draws off the inner-wrapper strip in essentially the same manner as in the case of the outer-wrapper strip. The location and arrangement of each will be pointed out in its appropriate place; but as they and their locking devices and trips are of similar construction the detailed explanation above given may be understood as applying to each and only general reference or explanation may be made as to the second and third pairs.

*The cutter.*—It is important to effect a clean and perfect severance of the wrapper-blanks from the wrapper-strips and to prevent the severed edges from becoming caught in or engaged with any part of the mechanism, since clogging of the machine and imperfect wrapping of the parcels would result. To attain these results, I employ two cutters of similar construction, that which acts upon the outer-wrapper strip being illustrated in Figs. 5, 8, 9, 12, and 13. Referring to these figures, 5 indicates the upper table of the machine, to the under side of which are bolted or otherwise made fast vertical guides 36 to receive and guide the carrying-slide 16ª of a cutter-blade or cutter 16, already referred to as coincident with or marking the starting point or position of each fresh or newly introduced wrapper-strip 12. The actual stop or gage is not the blade itself, but a stem 69, (seen in Fig. 32,) as will be explained farther on. The blade or cutter is preferably highest at the middle and inclined thence downward toward its respective edges, so that it shall begin its cutting midway between the edges of the strip and cut thence to said edges. Vertical motion is imparted to the cutter or blade at proper times by an elbow or bell-crank lever 37, fulcrumed upon the framing of the machine and having its depending arm furnished with a stud or bowl 38, which, entering the cam-groove of a face-cam 39, is moved toward and from said shaft at proper times and at other times is held against movement owing to the circular or concentric form of portions of the cam-groove.

Above the bed or table 5, which is slotted or cut away for the passage of the cutter and its slide or carrier, are arranged two vertical guide-rods 40, each having its lower end seated in a socket in the bed or platform 5 and its upper end steadied and sustained by a standard or bracket 41, made fast at its lower end to the table 5 and having at its upper end an overhanging portion in which the upper end of one of the rods 40 is held. The rods thus sustained afford a stable guide for a cross-head 42, which is vertically movable thereon and which constitutes the second member of the cutting mechanism, its lower edge being carefully ground or dressed to form a sharp and well-defined angle to coöperate with the blade 16.

However carefully the parts may be made and adjusted it is found in practice that at times, and particularly after subjected to considerable wear, the cutter-blade, unless in some way held up to the cross-head 42, will set away therefrom and permit the paper or wrapper-strip to enter between the two members of the cutting device. To obviate this difficulty, there is hinged or pivoted to the rear face of cross-head 42 a hanging plate or guard 43, which is drawn constantly toward the cross-head by a spring 44, encircling a screw-stem 45, the threaded end of which is screwed into plate 43, while its body passes through an opening in the cross-head 42 and its head is on the forward side thereof. The spring 44 bears at one end against the under side of the screw-head and at the other end against the cross-head 42, as illustrated in Figs. 8 and 9. The inner face of the plate or guard 43 is slightly beveled to permit the entrance of the thin upper edge of the blade 16 between the members. The pressure of the spring applied through the plate 43 to the back of the cutter-blade 16 maintains it in close contact with the rear face of cross-head 42, and thereby causes a clean severance of the wrapper-strip to be effected. It is of course necessary to hold down the wrapper-strip during the rise of the knife or cutter, and this is done by the cross-head 42 and its guard-plate 43, actuated at proper times to clamp and to release the strip.

The elevation and the depression of the cross-head are effected by the mechanism shown in Figs. 5, 12, and 13, where it will be seen that a lever 46 is fulcrumed in an upward extension of one of the standards or brackets 41 and is connected by a short link 47 to the cross-head 42, the outer extremity of lever 46 being pin-jointed to a rod 48, which is in turn pin-jointed to one end of a lever 49, fulcrumed at a point between its ends and carrying at its opposite end a stud or bowl 50, which enters a cam-groove in one side face of the wheel 39.

Other forms of cutter may be employed with goods results, though I deem that described best suited to the work. I desire, however, to say that the plate or guard 43 and its spring-pressure device is the invention of another, and hence will not be claimed by me.

The link 47 permits the lever 46 to impart motion to the cross-head without cramping or binding and without side thrust upon the cross-head or its guides. To prevent lateral play of lever 46, it is advisable to guide its free end in a slotted post or standard, as shown in Figs. 2, 5, 12, and 13.

I have described the outer-wrapper nippers, which I have designated in their entirety by the letter A to distinguish them from the transfer-nippers B and the inner-wrapper nippers C, all of which are alike in their main features of construction, for which reason it will be unnecessary to describe each in detail. Such features as are peculiar to each will, however, be pointed out and designated by different numerals, whereas parts identical in construction are designated alike.

*Transfer-nippers.*—After a wrapper-blank is cut from the outer-wrapper strip it requires to be moved at right angles to the path of said strip to a point where the inner wrapper may be laid upon it preparatory to receiving the gum or other body to be wrapped. For this purpose I provide the transfer-nippers B. (Shown in Fig. 14.) The nippers, *per se,* are of precisely the same construction as the outer-wrapper nippers except for a slight variation in the jaws, comprising, as they do, a slide, in this case designated as 51, carrying a fixed jaw 17, pivoted jaw 18, and hook 20, the latter drawn toward member 18 by a spring 21; but these transfer-nippers push the severed blank before it instead of drawing or pulling it. Instead, however, of the compound-lever mechanism employed to open both the outer-wrapper nippers and the inner-wrapper nippers I provide the hook 20 of the transfer-nippers with a lateral stud or projection 52, and I arrange in the path thereof a stationary finger or upright 53, (Figs. 2 and 14,) which arrests the movement of the hook and permits the pivoted member 18 of the nippers to withdraw from engagement therewith, as will be understood upon comparing the full and the dotted lines of Fig. 14. The finger 53 is located in such position as to arrest the movement of the hook just as the nippers B are completing their inward movement to transfer the wrapper to receiving position, and consequently the wrapper is released just at the instant that it reaches its intended position.

The jaws of nippers B are of the form shown in Fig. 16, where the lower jaw is shown as provided with a slight offset or side lip $18^b$ on the side from which the wrapper-strip 12 approaches, this lip being slightly beveled on the upper side, as shown. The upper jaw is similarly beveled on its under side just above the side lip $18^b$, the contruction described serving to insure entrance of the strip between the jaws and to prevent its falling to the table below.

A reciprocating motion is imparted to the nipper-carrying slide 51 by means of a lever 54 of the first order, fulcrumed upon a post or standard 55 and having one end connected with one end of a second lever 56, also of the first order and fulcrumed upon the post or standard 55, said lever 56 having a stud or bowl which enters a cam-groove of the face cam-wheel 27 carried by the main shaft 6. The upper end of lever 54 is connected by a link 59 with the slide 51, and sufficient play is afforded in the joint or connection between levers 54 and 56 to prevent their locking in moving about different centers.

*Transfer-nipper release.*—The nippers B stand normally, or when at rest, in the position indicated by full lines in Fig. 14, where they are held open to receive the advancing wrapper-blank. Immediately after receiving said blank and just before starting forward therewith the nippers are caused to close thereon by means of the vertically-movable finger 60, carried by a rock-shaft 61, mounted in bearings on the bed or table 5 and provided with a depending arm 62. This arm 62, which is shown in Fig. 2, is connected by a link 63 with one end of a lever 64 of the first order fulcrumed in an arm or bracket 65 beneath the bed or table 5 and carrying at its free lower end a beveled striker-plate 66, which is periodically engaged and pressed aside by a pin or stud 67, projecting from the periphery of a wheel 68. The mechanism thus described causes finger 60 to act quickly to depress the rear end of lever or member 18 of the nipper B and to carry it below the nose of hook 20, which promptly engages it and prevents its rise until by reason of the advance of the nippers the hook 20 collides with finger or stem 53 and is disengaged from the nipper member.

*Inner-wrapper nippers.*—The construction of the inner-wrapper nippers is the same in all material respects as that of the outer-wrapper nippers, and for that reason the lettering of the parts of the nippers proper will be the same. So, too, the manner of actuating the nippers, of locking them upon the wrapper-strip, and of unlocking them is the same. To avoid confusion of reference, however, the slide, link, lever, and cam, by which motion is imparted to these nippers, are designated by different numerals from the corresponding parts of the outer-wrapper nippers. These parts are shown in Figs. 2, 4, and 30, where C indicates the nippers as a whole; 17, the fixed, and 18 the movable, member thereof; 18', the raised bearing-point on the movable member; 20, the locking-hook, and 21 the spring controlling said hook. These pincers are carried by a slide 70, connected by a link 71 with a lever 72 of the third order, fulcrumed upon a block or lug 73, rising from the base plate or bed 1 of the machine and carrying a bowl or stud 74, which enters the peripheral cam-groove of a cam-wheel 75, carried by the main shaft 6. The pincers are closed to permit them to be locked by the hook 20 through the action of overhanging finger 22 of the elbow-lever, fulcrumed upon a plate or bracket 23, bolted or otherwise secured to the upper bed or table 5 of the machine, as in the case of the nippers A. The lower arm of this elbow-lever, extending through and beneath the bed o rtable 5, is connected by a link 76 with an upwardly-projecting radial arm 77 of a rock-shaft 78, carried in a bracket or hanger 79 beneath the bed or table 5 and having a second downwardly-extending arm 80, as shown in Fig. 30. The free end of arm 80 stands in the path of a lug 81, carried on the periphery of the wheel 27, which carries the stud 26, so that once in each revolution of the shaft under the organization and arrangement of parts here shown the arm 80 is swung backward and caused, through the connections described, to depress finger 22, and thereby to close the pincers. As shown by dotted lines in Fig. 30, the location of the finger 22 is such as to cause it to bear upon the bearing-lug 18' when the pincers C are in their advanced position, in which they receive the end of the inner-wrapper strip 10.

It has been suggested above that the opening or separation of the nipper members might be effected by giving to the jaw end of member 18 a preponderance of weight over the lever end by means of a spring or in any equivalent way. It will be observed, however, upon referring to Figs. 3, 4, 8, 9, 10, 11, and 30 that the rear end of member 18 is beveled or cut away toward the lower side, making an oblique bearing-face against which the nose or beveled upper end of hook 20 presses when not held back by the retracting lever or finger. The long arm of member 18 is quite elastic, and in being forced down by one or another of the fingers 22 and 60 is caused to spring slightly after the jaws are closed upon the wrapper-strip or the blank, as the case may be. As a consequence of this construction, said long arm of the member 18 when released by retraction of the hook 20 springs slightly above the nose or point of the hook, so that the beveled end of the hook may bear against the beveled end of the member 18, and by reason of the pressure due to spring 21 serves to elevate the long arm, and consequently to depress the short or jaw arm of the member 18, thereby opening and holding open the nippers.

*Inner-wrapper cutter.*—In Figs. 2, 4, and 30 I have shown a cutter for severing wrapper-blanks from a long strip 10. This cutter is in its main features similar to that which severs the blanks for the outer wrapper from the strip 12—that is to say, it comprises a cutter-blade 83, carried by a vertical reciprocating slide 84, movable in guides or ways formed in a guide block or bracket 85, bolted or otherwise made fast to the under side of the bed or table 5, said blade coöperating with a vertically-movable cross-head 86, carrying a hinged or pivoted guard-plate 87, which is pressed toward the upright face of the cross-head 86 by a spring 88, encircling a compression-screw 89, passing through an opening in said hinged guard-plate and screwing into the cross-head, as best seen in Fig. 30, but shown also in Figs. 2 and 4. The cross-head 86 is formed upon or is bolted to one side of a larger or main cross-head 90, hereinafter referred to. The slide 84 is vertically reciprocated by means of an elbow-lever 91, having a stud or bowl 92, which takes into the same cam-groove of wheel 39 as does the bowl 38 of lever 37, which actuates the slide carrying the cutter-blade 16 for severing the outer wrapper-strip. The one wheel and the single groove are thus made to actuate both blades or cutters, but as the bowls are on opposite sides of the axis of the wheel or of the shaft 6 it is manifest that the cutters are operated in alternation.

*Wrapper tension.*—In order to secure a proper feed or delivery of the wrapper-strips to prevent the same from buckling or sagging and to preclude an undue length being drawn out by the nippers, they are carried through troughs 93 and 94, respectively, and these troughs are in turn each provided with a pressure-plate 95, each hinged or pivoted in the side walls of its trough and having its free edge arranged to bear upon the wrapper-strip beneath it at the delivery end of the trough. These plates appear in Figs. 1, 2, 3, 4, 8, 9, 30, and 32, one or the other being shown in each of said figures. The weight of the plate may be made sufficient in each instance to give the requisite tension or resistance to feed of the paper; but it is preferred to make the plate comparatively light and to supplement its weight by spring-pressure. This pressure is given to the plate 95 of trough 93 through a vertical stem 96, movable in a sheath or shell 97, formed in the outer or free end of a spring carrying-arm 98, arranged to swing horizontally about a vertical post 99, screwed into the bed or top plate 5 of the machine, said parts being best shown in Fig. 32, where the spring 100 is indicated by dotted lines. The same post 99 serves as a support for a swinging arm 101, carrying a shell 102, in which is arranged a vertical stem 103, which is pressed down upon the plate 96 by a spring contained within the shell or casing 102 in the same manner as is the stem 96. By mounting the pressure-stems 96 and 103 in swinging arms each may be carried to a position directly over the plate upon which it bears or may be swung entirely clear thereof, as indicated in Fig. 32. Moreover, each may be made to bear upon its pressure-plate at a point nearer to or farther from the pivot-axis, and thereby to apply its pressure with varying advantage or effect.

To insure a retention of the pressure-stem at the desired adjustment, each tension-plate is provided with a series of shallow depressions or sockets 104, as shown in Fig. 32, to receive the lower end of the pressure-stem. These sockets are shown also in Figs. 8, 9, and 30. The sockets are shallow and rounding or hemispherical, and the lower ends of the stems 96 and 103 are rounded or beveled, so that they may readily pass into and out of the sockets upon the application of slight lateral pressure to their carrying-arms and without the necessity of independently lifting the stems.

The carrying-arms 98 and 101 are each provided with a thumb-piece or handle 105, by which to move it to and from its operative position, the thumb-piece of arm 98 being shown in Figs. 3 and 32.

The several nipper mechanisms being constructed and arranged as above described and combined with the tension devices and cutters, the operation of these parts is as follows: First, the nippers A advance and draw forward the outer wrapper-strip 12 the precise distance required to produce one blank. The cutter-blade 16 then rises and severs the blank from said strip, said blank having been drawn between the open edges of the nippers B in the act of advancing it the distance necessary to produce a blank. Next in order, the nippers B move forward and carry the severed blank to the position in which it lies when the gum or other material to be wrapped is delivered to it; but before the nippers B release their hold upon the wrapper the nippers C advance, seize the inner wrapper-strip 10, draw it forward directly across the top of the outer wrapper-blank the distance necessary to produce the inner wrapper-blank, whereupon the knife 83 rises and severs the inner wrapper-blank, leaving it in position upon the top of the outer wrapper-blank, as shown in Fig. 15.

As above stated, the gum, chocolate, or other material to be wrapped is contained in a vertical magazine 13 at the front of the machine, the cakes or blocks being superposed upon one another and naturally gravitating to the bottom of the magazine. Inasmuch, however, as the gum and the chocolate are both somewhat sticky and as the gum is necessarily covered or sprinkled with a powder which in time adheres to and tends to form a coating upon the rods of the magazine, it is necessary that free access be had to the contents of the magazine to loosen up the same and insure proper feed and delivery thereof. For this reason the forward side of the magazine is left open, as above explained, and a rod, knife, or other implement may be inserted at any time. The skeleton or rod construction also permits access at the sides.

*Delivery mechanism.*—To deliver the gum, chocolate, or other merchandise from the magazine to the wrappers, I employ mechanism illustrated in Figs. 1, 2, 4, 5, 14, 15, and 17.

Upon referring to Figs. 5, 14, and 17 it will be seen that the bottom of the magazine 13, formed by the block or base-piece 14, has its gum or goods supporting face raised above the level of bed or table 5 to a height equal to the thickness of the cakes, packages, or bodies of gum, chocolate, or other substances contained in the magazine. The base-piece 14 is of box-like form, as best seen in Fig. 15, its form and dimensions being such as to accommodate freely the cakes of material, and just above its bottom or supporting-surface it is cut away on the front and rear sides to permit the passage through it of an ejecting-slide 106. This slide plays in horizontal guides or ways 107 and is moved forward and backward at proper times by mechanism shown in Figs. 1 and 17, comprising a bifurcated lever 108, connected by a link 109 to slide 106 and by a second link 110 to an upright lever 111, fulcrumed at its lower end and provided with a stud or bowl 112, which lies in a cam-groove formed in the side face of cam-disk 27 opposite that containing the first-mentioned groove carried by shaft 6.

Equivalent connections and actuating devices may be substituted for that just described, and the same is true of other connections, those shown and described being, however, adopted because of their being best adapted to the work to be done, having due regard to the space available and to the location of other parts.

Just back of or inward from the magazine there is a rising-and-falling guide comprising two parallel arms 114, parallel and in line with the end walls of the space in block or base 14 of the magazine 13, and an intermediate bridge or plate 115, preferably having its upper face ribbed or grooved, as seen in Fig. 15. The arms 114 are cut away or brought to a triangular form where they project beyond the bridge or plate 115, as they do for about one-half their length. The guide is pivoted or hinged close to the inner side of or just behind the base 14 of the magazine and is adapted to rise to a vertical position, as in Fig. 14, and to fall to a horizontal position, as in Figs. 15 and 17. When elevated, the arms 114 are out of the way of the nippers by which the wrappers or wrapper-blanks are placed in position to receive the gum or other substance; but when lowered they serve to press upon and to clamp the wrappers, thereby maintaining them in proper position while the gum or merchandise is delivered to and placed upon them and until the folding of the wrappers proceeds to a certain point.

The purpose of providing the upper face of the bridge or plate 115 with ribs or grooves is to lessen the adhesion of the gum, chocolate, or other substance delivered from the magazine to said bridge or plate in passing over the same. While theoretically and within limits practically friction is proportional to the weight or pressure with which bodies are held in contact, it is nevertheless true that materials of an adhesive, sticky, or gummy nature may be more readily moved over a ribbed or grooved surface than over a smooth or plain surface. Any material adhering to the narrow parallel ribs is the more readily removed or worn off by the travel over them of successive bodies.

The rising-and-falling movements of the guide 114 115 are produced at the proper times by means illustrated in Figs. 15 and 17 and more or less fully in Figs. 1, 2, 3, and 5. As shown in Fig. 15, one of the arms 114 has attached to or formed upon it a secondary arm or lever 116, extending from its pivot-axis in a direction the reverse of the arms 114, and, as seen in Fig. 17, this arm 116 is connected by a link 117 with one member of an elbow-lever 118, the other member of which connects by a link 119 with a lever 120, fulcrumed between its ends and carrying at the end opposite the link 119 a stud or bowl 121, which extends into a cam-groove in the side face of cam-wheel 68, which, as before stated, carries the lug 67. Bridge or plate 115 is of the same thickness as and when lowered forms a continuation of the bottom or supporting plate of the magazine 13, so that slide 106 in moving inward carries the gum, chocolate, or other substance across the bridge and delivers it over the edge thereof to the wrappers held by the arms 114. The movement of slide 106 is such as to carry the gum or other body the precise distance required; but to guard against overcarriage by reason of momentum or from other cause suitable stops are provided, which serve both to limit the travel of the gum and to hold or assist in holding the wrappers against displacement. These stops will be described later on.

Rising from the bed or table 5 at each end thereof is a standard 122, and reaching from one standard to the other and firmly secured to both is a broad bar 123, which serves as a support for various parts of the mechanism. At or about its mid-length that bar 123 is formed with a projecting bearing-face 124, (best seen in Fig. 33,) planed true and smooth and serving as a supporting or bearing surface for a vertically-reciprocating cross-head or slide 90. To retain the cross-head or slide 90 in proper position and to guide it in its movements, it is furnished with vertical guide-rods 125, which are securely held in ears 126, formed upon the cross-head, and pass through perforated ears or brackets 127, formed upon or secured to the cross-bar 123, as seen in Figs. 33 and 34. The cross-head 90 carries the smaller cross-head 86, hereinbefore referred to as bearing the hinged guard-plate 87 and constituting therewith the upper member of the inner wrapper-cutter.

Cross-head 90 is raised and lowered at proper times by mechanism illustrated in Figs. 1 and 17. As best shown in Fig. 1, a link 128 connects the cross-head 90 with a radial arm or crank 129, carried by a rock-shaft 130, supported in boxes or bearings on the top of cross-bar 123, and said rock-shaft overhangs the end of said bar and is furnished at its projecting end with a second radial arm or crank 131, projecting in a direction the reverse of arm 129. From the crank-pin of crank-arm 131 there is hung a rod or bar 132, the lower end of which is enlarged and is vertically slotted to enable it to straddle or encircle and to move vertically with reference to main driving-shaft 6. The rod or bar 132 carries a stud or roller 133, which rests upon and is periodically pressed upward by a cam 134 on the main shaft 6, as seen in Fig. 17, thereby elevating the rod or bar, rocking shaft 130, and moving downward the cross-head 90. The reverse movement of said parts may be effected by gravity, due to the weight of the rod or bar, or by making the cam 134 a cover-cam, or by the aid of a spring, as preferred.

135 indicates a secondary cross-head, (best seen in Figs. 17, 18, 19, and 33,) provided with perforate ears 136, which slide upon guide-rods 137, securely held in the ears 126 of the main cross-head 90. By this arrangement the main cross-head is made to support and afford guidance for the secondary cross-head, while the movements of each are left entirely free and independent of those of the other. Secondary cross-head 135 is periodically raised and lowered and is given a downward movement, which at first is quite rapid, but which near the finish becomes quite gradual or slow; a quick return or upward movement, and is held for a time in its elevated position through the aid of mechanism shown in Figs. 18 and 19. This mechanism consists of an overhanging arm 138, carried by the rock-shaft 130 and having its free end connected by a link 140 with the cross-head 135. The link is made adjustable for the purpose of permitting the proper positioning of the cross-head 135 relatively to the main cross-head 90. Rock-shaft 139 is in axial alinement with the rock-shaft 130, but runs to the opposite end of cross-bar 123, above which it is supported in bearings in a manner similar to the shaft 130. Its movements are effected in a manner similar to those of the main cross-head 90—that is to say, the rock-shaft is furnished with a radial arm 141, extending to the opposite side of the rock-shaft from that on which arm 138 is located, and this radial arm has suspended from it a rod 142, which is slotted at its lower end to straddle the main shaft 6 and to permit vertical movement relatively thereto. It is further provided with a roller stud or bowl 143, which extends into a cam-groove of proper form made in the side face of a cam 144, carried by the shaft 6 at the end of the shaft opposite that at which is located the cam 134.

The cross-head 135 has formed in its inner side walls vertical grooves to receive and guide a presser slide or finger 145, the office of which is, first, to press down the block or cake of gum, chocolate, or other merchandise, and subsequently to bear upon and hold the inturned ends or sides of the wrappers one after another to prevent their curling or springing back and toward against their being folded upon themselves or in any manner thrown out of proper shape. This presser slide or finger 145 is moved vertically at proper times by a lever 146, fulcrumed in an arm or bracket at the back of plate or cross-bar 123 and projected through openings 147, 148, and 149, formed in the bearing-plate 124, the cross-head 90, and the cross-head 135, respectively, the free end of said lever entering an opening 150 in the upper end of the presser slide or finger, as seen in Figs. 17, 18, and 19. The rear end of said lever 146 is slotted, as shown in Fig. 17, to receive the crank-pin 151 of a crank-arm 152, carried by a rock-shaft 153, as seen in Fig. 2. This rock-shaft 153 is carried in suitable boxes or bearings on the back of cross-bar 123 below and parallel with the rock-shaft 130 and carries at its outer end a crank-arm 154, which has suspended from it a rod or link 155, slotted and straddling the shaft 6 in the same manner as do the rods 132 and 142. So, too, the rod 155 is provided with a stud or bowl 156, which takes into a cam-groove in one side face of the wheel 144ᵃ, and thereby gives motion to the rock-shaft 153 and through its crank-arm 152 to the lever 146. The lever 146 might of course be placed directly upon the rock-shaft 153; but the construction shown and described is adopted because of the greater convenience in mounting or assembling the parts.

The precise shape and arrangement of the cams and levers is not of essential importance, though it is important that they be such as to impart motion to the cross-heads and presser-slide in proper time and order. Without tracing out the action and order of movement of each individual cam, it is sufficient at this point to state in general terms that the cross-head 90 first descends, causing its spring-pressed toes 157 to bear upon and to hold against accidental displacement the outer wrapper, as indicated in Fig. 17, the fingers serving the further purpose of a stop or gage to preclude the cake of gum, chocolate, or other material from being carried too far inward through momentum. These are the stops before alluded to.

Immediately after the gum or other material is deposited upon the wrapper the cross-head 135 and the presser-finger 145, the lower ends of which are at that moment flush with each other, descend together and bear upon the gum or other material, as shown in Fig. 18, continuing their downward movement until the gum is carried with the wrappers through an opening in the bed or table of the machine to a level flush with or slightly below that of the upper face of the table. Directly beneath this opening there is a curved spout or chute 158 of tubular form in its upper portion and of a size equal to that of the opening in the table through which the gum is pressed. This tube or spout in the first instance contains a friction-block 159, which affords sufficient friction to prevent the packages from dropping down by gravity and upholds them until by reason of the introduction of successive packages into the spout or tube those first introduced are gradually pressed forward toward the delivery end. The lower or delivery end of the spout assumes a horizontal or approximately horizontal position, and the accumulation of packages therein affords friction and retardation sufficient to sustain the packages in the vertical or upright portion of the tube or spout and to give adequate support thereto. In pressing the gum or material through the opening in the bed or table the two wrappers are carried with it, since, as before explained, they lie one upon the other over the opening, ready to receive the gum, as illustrated in Fig. 15. The ends of the inner wrapper and the sides of outer wrapper are consequently left standing in vertical planes, as indicated in Figs. 19 and 26. The cross-head 90, having meanwhile risen to its highest point, the cross-head 135 next rises, as indicated in Fig. 19, but the presser finger or slide 145 remains down, bearing upon the gum or other material and preventing its being thrown above the level of the table by the elasticity of the wrappers of packages beneath it, which do not immediately set and lose their tendency to spring open. It will thus be seen that the cross-heads and the presser-finger constitute, in effect, parts of the delivery mechanism, since they serve to deliver the gum to the wrappers and into or through the opening in the bed or table of the machine.

Before further describing the wrapping operation it will be necessary to explain the gumming of the outer wrapper and thereafter the folding mechanism employed to turn inward and downward the ends of the inner wrapper and the sides or edges of the outer wrapper.

*Gum-moistening mechanism.*—In machines of this more common character where the operations are automatically performed it is the general custom to apply the paste in a moist state to the wrappers in the machine. Such method I find open to serious objections, prominent among which is the liability or certanity of rendering the parts of the mechanism so gummy or sticky and foul as to preclude their proper and efficient operation after a comparatively short time. To obviate this difficulty, I gum the outer wrapper on its inner face along one edge, using for the purpose a gum or mucilage which, though allowed to dry before the wrapper-strips are placed in the machine, may nevertheless be readily rendered soft or sticky through the application of moisture.

The machines thus far employed are designed to apply a special wrapper—that is to say, one containing a special design or advertising matter which in the strip 12 is repeated lengthwise of the strip as many times as there are wrapper lengths in such strip. The wrapper-strips 12 are fed into the machine one after another either automatically or manually with the printed face down and with the line of gum on its upper face and toward the front of the machine or toward that side at which are located the magazine and the delivery spout or tube 158.

Just forward of the knife or cutter 16 (speaking with reference to the direction of travel of the strip 12) there is located a moistening device comprising a small water tank or holder 160, containing a lower roller 161, of cork, felt, or equivalent material adapted to absorb and hold moisture and to deliver the same to a second roller 162, which is above the level of water within the tank or holder 160 and is preferably made of soft rubber. The roller 162 extends upward slightly above the top of the tank or holder 160 and through an opening in a plate 163 on the bed or table 5 of the machine, its periphery protruding very slightly above said plate.

Just above the roller 162 and running very close to but preferably not in actual contact therewith is a third roller 164, carried by a stud-collar projecting from a lug or bracket 165, formed upon a top guide-plate 166, lying over the plate 163, but slightly separated therefrom where the wrapper-blank 12 passes between the upper and lower plates 163 and 166, as illustrated in Figs. 6 and 7. The roller 164 may be adjusted vertically by loosening the screw 166ª, by which its axle is clamped in bracket 165, said bracket being slotted to permit such adjustment, as indicated by dotted lines in Fig. 6.

167 indicates a reservoir mounted upon a suitable bracket or support at the back of the machine or in any other convenient position, the bottom of said reservoir being preferably about on a level with the bed or table 5 of the machine, as seen in Fig. 5. The reservoir is provided with an outlet pipe or tube 168, containing a cock or valve 169, by which the delivery or escape of water or moistening fluid may be nicely regulated. The tube 168 communicates, by a flexible or other pipe or tube 170, with the tank or holder 160. Said tank or holder is provided with an outlet 171, the lower side of which is just below the contact level of the rollers 161 and 162, as plainly shown in Fig. 6. This outlet-opening 171 has connected with it a waste-tube 172, by which any surplus of water or fluid delivered to the tank may escape, thus preventing the water from rising above the desired level. As the nippers A draw forward the strip 12 passes the cutter-blade 16, preparatory to cutting off a wrapper-blank. Its ungummed edge is carried between the guide-plates 163 165 and between the rolls 162 164, thereby causing said rolls to rotate. The roller 160 being constantly moist delivers moisture to the periphery of roll 162, which rests by gravity upon the roller 161, and said roller 162 in turn delivers moisture to the under face of the strip 12 throughout the length of the portion drawn forward by the nippers A, the upper roll 164 holding the paper in contact with the roll 162, and thus insuring a proper moistening. The rotation of the rolls 161 162 in contact with each other occurs at such frequent intervals that the rubber roll 162 (which is non-absorbent) remains thoroughly moistened from one operation to another, hence is always in condition to properly moisten the wrapper-strip.

It is to be particularly noted that the moisture is not applied to the gummed portion of the strip, but to the edge farthest therefrom. Hence there is no liability of gumming or fouling the nippers which deliver the severed blank to the folding devices. It is important that those portions which are liable to become wet or moistened be of non-corrosive material and that such portions as come in contact with the gum, chocolate, or other sugar-bearing material be such as will permit the constant contact of the sugared substance with them without danger of gumming. I therefore make the roll 164, the guide-plates 163 and 165, and those parts through and over which the gum or chocolate passes—notably, the bottom of the reservoir, the bridge 115, and its arms 114, the feed slide or plunger 106—of German silver. While this is not essential, it is of very material advantage, long-continued use having demonstrated that this alloy possesses the peculiar property of acting in contact with the sugared bodies without becoming thereby fouled or gummed, and since it does not rust and does not require oil to render it practically or sufficiently frictionless it fulfils in a peculiar manner and marked degree the peculiar requirements of the situation.

Having now explained the manner of moistening, the wrapping may be again taken up, in connection with Figs. 5 and 17 to 30, inclusive. It has been above explained that the gum, chocolate, or other material is pressed through the opening in the bed or table, carrying with it the superposed wrapper-blanks, leaving the ends of the inner blank and the sides of the outer blank standing in vertical position, as indicated in Figs. 19 and 26. The next operation is the inturning and folding of the ends of the inner wrapper, which is effected by the mechanism shown in Fig. 20. This comprises two horizontally-movable slides or folders 173 and 174, movable in guides or ways in or upon the bed or table 5 of the machine, which slides are carried, respectively, by levers 175 and 176. Lever 176 is secured upon a vertical stem or rock-shaft 177, which constitutes its fulcrum and which is located between the ends of said lever. To one end of the lever 176 the slide 174 is connected by a loose joint or swivel sufficiently free to compensate for the slightly-curved path of the lever, so as to permit a right-line movement of the slide, while the other end of said lever is connected by a bar 178 with lever 175 at a point between the ends of the latter. Lever 175 is fulcrumed at one end and at its movable end is connected with slide 173 in the same manner as is slide 174 to its actuating-lever 176.

Rock-shaft 177 carries a crank-arm 179, which is connected by a rod or bar 180 to the upper end of an upright lever 181, fulcrumed at its lower end in a block or support 182, carried upon the base 1 of the machine. A vibratory movement is imparted to the lever 181 by means of a roller-stud or bowl 183, projecting into a cam-groove in the side face of a cam-wheel 184, carried by the main shaft 6. It will be seen that as a result of this construction and arrangement of parts a movement of the lever 181 and connecting-rod 180 first in the direction indicated by arrows will swing the crank-arm and rock the shaft or stem 177 in such direction as to move the lever 176 and slide 174 inward toward the wrapper-blank and cam, causing it to press against and to bend or fold down that end of said blank immediately in front of it. As the slide-carrying end of the lever 176 moves inward its opposite end of course moves outward and through the connecting-bar 178 draws upon and moves inward the lever 175, thereby carrying inward the slide 173 and causing the latter to bear against and to fold down the second end of the inner wrapper, as plainly indicated in Fig. 20.

The groove of cam-wheel 144, which controls or determines the movements of the presser slide or finger 145, is of such configuration that just after the slides 173 and 174 begin to move inward said presser-finger is raised sufficiently to clear the slides and permit their free and full inward movement, but that as the slides move outward the presser-finger promptly descends and bears upon the inturned ends of the inner wrapper, as indicated in Figs. 21, 22, and 27, Fig. 21 indicating by arrows the relative movements of the parts, and Fig. 22 showing the presser-finger reaching the inturned ends slightly before the slides 173 and 174 withdraw from over the wrapper. By this means the ends of the inner wrapper are prevented from springing back or following the receding slides 173 and 174 and are held properly in position, bearing closely against the ends of the contained gum or chocolate. As the slides 173 and 174 complete their outward movement or withdraw entirely from over the wrapper, the moistened edge of the outer wrapper-blank is folded inward and laid upon the previously-folded inner wrapper by means of a slide 185, movable in guides or ways in or upon the upper face of the bed or table 3, and a longitudinally-reciprocating motion is imparted to the slide 185 by the mechanism shown in Figs. 3, 5, and 23. As shown in these figures, and particularly in Fig. 23, the slide 185 has on its lower face a stud which projects downward through an opening in the bed or table and enters the slotted end of a lever 186, fulcrumed beneath the bed at a point between its ends, its opposite end being connected by a link 187 with a vertical lever 188, fulcrumed at its lower end in a suitable support 189, mounted upon the base or bed of the machine. A roller-stud or bowl bears upon the cam-surface of a disk 190, which in practice may and preferably will be a cover-cam, so as to give positive movement to the lever in both directions. In this figure, however, as in other detail views, the cover portion of the cam is omitted for the purpose of more clearly showing parts which fall in line one with another and which would be hidden were the complete cam shown. It may therefore be understood that cover-cams may be used throughout, the present remark applying particularly, however, to cams 134 and 190 and to the cam shown in front of that last mentioned in Fig. 23. In practice only such cams are used. As the lever 188 is vibrated by the cam 190 (or is moved in one direction by the cam and returned by spring or other suitable means, if preferred) the slide 185 is longitudinally reciprocated. The timing of the movements is such that the slide advances only as the end-folding slides 173 and 174 complete their withdrawal, and the movement is such that beginning at a point immediately back of the upturned side or edge of the outer wrapper (which is the moistened edge) it presses said wrapper forward and lays it downward upon the infolded ends of the inner wrapper, as indicated in Figs. 23 and 28, thereby bringing the moistened edge into horizontal position, as indicated in Fig. 28, ready to receive the gummed opposite edge, which at that moment stands in the vertical position. (Indicated in the same figure and represented by a black or thickened line in Fig. 23.)

The form of the presser finger or slide 145 is such that its point or lower end stands well forward from the slide 185, leaving clear space sufficient for the full movement of the slide and for the inturning or folding down of the edge or side of the paper acted upon by said slide, as is indicated in Fig. 23. Immediately after the slide 185 completes its inward movement it begins to recede, and at the same time the presser-finger 145 rises, both as indicated by arrows in Fig. 24. Immediately upon the elevation of the finger 145 and simultaneously with the withdrawal of the slide 185, a second slide 191 advances from the side of the folding chamber or mouth of the discharge-tube 159 opposite that at which the slide 185 is located. This slide 191 presses the upturned gummed side of the outer wrapper inward and downward, as indicated in Figs. 24 and 25, until it is completely laid upon the moistened edge previously turned in. The slide 185 being now completely withdrawn, the elasticity or springiness of the packages beneath (which is considerable) causes the uppermost package to be pressed with some appreciable force against the under face of the slide 191, thus insuring perfect contact of the moistened and the gummed surfaces and insuring an immediate adhesion of said surfaces. This might, if the packages were at once freed, be or become imperfect; but as further packages are delivered into the mouth of the opening with considerable rapidity, varying from thirty to sixty per minute or upward, it will be seen that each package will be subjected for a considerable period of time to the weight and pressure of those above it, since the chute or discharge-tube is of such length as to contain a very considerable number of packages, and the discharge is effected over the nearly horizontal delivery portion only through the pressure from above. It will be readily understood from what has been above stated that the cross-heads in descending force down the accumulated packages.

The slide 191 is operated in essentially the same manner as the slide 185, a vertically-disposed rock-shaft 192 having its upper arm 193 slotted to receive a stud or screw depending from a block on the under side of the slide 191, while a second arm 194 is connected by a link 195 with an upright lever 196, fulcrumed in a support 197 and provided with a bowl or roller-stud 198, actuated by a cam 199, which, as above pointed out, will in practice advisably be a cover-cam, though here represented simply as an edge or peripheral cam for the purpose of enabling the different parts in line to be better shown.

As has already been suggested, the precise form and arrangement of the cams is of minor consequence, provided the parts be properly timed and moved in relation to one another. So, too, it is unimportant whether each cam be made distinct in itself or two or more be combined in one disk—as, for instance, by making separate cam-grooves in opposite faces or in the periphery, or both.

In any machine of this character requiring to be supplied from time to time with wrapper-strips, or in which there is a liability of stoppage from any cause, it is important that provision be made for promptly throwing the machine out of action, and it is very desirable that in the event of failure of wrapper-strips the machine shall automatically cease to operate. To attain this end, I adopt the driving-gear and clutch mechanism illustrated in Figs. 1, 2, 3, 4, 31, and 32, which will now be described. The main cam-shaft 6 carries a gear-wheel 200, which meshes with and is driven by a pinion 201. (Shown in dotted lines in Fig. 2 and in full lines in Figs. 3 and 4.) The pinion 201 is carried by a shaft 202, (indicated by dotted lines in Fig. 1 and the end portions of which are seen in Fig. 3,) the intermediate portion being broken away to avoid obscuring other parts. Shaft 202 has mounted loosely upon it a gear-wheel 203, the outer face of which is cone-socketed to receive a friction-cone 204, as best indicated in Figs. 1 and 2. The outer end or portion of shaft 202 is provided with a spline or feather 205, (shown in Fig. 2,) which fits a groove or slide in the central opening or eye of the cone 204, thereby preventing rotation of the cone upon or independently of the shaft 202, though permitting it to move longitudinally thereon. The cone 204 is formed with a neck 206, which is circumferentially grooved or channeled to receive the roller-studs carried by a rocking yoke 207, which yoke is mounted upon a rock-shaft 208, turning in boxes or bearings on the bed 1 of the machine. This rock-shaft is provided at its forward or outer end with a crank-arm 209, which is connected by a link 210 with a hand-lever 211, located at the front side of the machine in convenient position to be grasped by the attendant. By moving the hand-lever 211 to the left (in Figs. 1, 2, and 4) under the arrangement of parts here shown, the upper end of the yoke 207 will be swung toward the gear-wheel 203, thereby carrying or forcing the cone 204 into its seat or socket in said gear-wheel and producing sufficient friction to cause the parts to rotate as one.

To hold the hand-lever 211 in position to retain the cone and gear in frictional engagement and prevent accidental stoppage of the machine, a spring-pressed locking-bolt or detent 212 is arranged to move longitudinally in a suitable guide 213 and to project its nose or outer end into a socket formed in the hand-lever, as will be readily understood upon referring to Figs. 1, 2, and 31. The nose or point of the locking-bolt is advisably tapered, so that a slight application of force to the hand-lever 211 will cause the bolt to recede and permit the lever to be thrown over without any special or distinct movement to release said lever, though means are provided whereby such release may be effected, if desired.

214 indicates a spring connected with the hand-lever 211 and tending constantly to throw it to the right in Fig. 1 or in a direction to effect the disengagement of the gear and cone 203 and 204, so that if the bolt be retracted in any manner the disengagement of said parts shall follow promptly and automatically.

To effect the automatic retraction of the bolt 212 and the consequent stoppage of the machine in the event that either wrapper-strip gives out, there is provided the mechanism shown separately in Figs. 31 and 32, but which is seen also in Figs. 1, 2, 3, and 4 in connection with other parts of the machine. As best shown in Fig. 31, the bolt 212 is circumferentially grooved to receive the forked end of one arm of an elbow-lever 215, hung upon a suitable pivot at the end of the main frame. By lifting the horizontal arm or member of this elbow-lever 215 the bolt or detent 212 is forced back against the pressure of its spring 213 and caused to release the hand-lever 211. For the purpose of thus lifting said arm of the elbow-lever I provide a rock-shaft 217, carrying at its extremities two arms 218 and 219. This rock-shaft is mounted in a sleeve or long bearing 220, which is secured by screws or other fastenings to the cross-bar 123, as indicated in the several figures above mentioned. From the arm 218 projects a stud or stem 221, which is connected by a vertical rod 222 with the horizontal arm of lever 215, as shown in Figs. 1 and 31.

223 indicates a lever pivoted at a point between its ends upon one arm 224 of a bifurcated standard, the other arm 225 of which has fulcrumed upon it a similar lever 226. From the short overhanging end of each lever 223 and 226 is suspended a link 227, which links are slotted at their lower ends, as shown in Figs. 31 and 32, each slot serving to receive a stud or pin projecting from one of the arms 218 or 219. The stem or stud 221 serves for this connection in the case of arm 218, while a separate pin or stud 228 forms the connection with the arm 219. It will be seen that under this arrangement either lever 223 or 226 may, through its link 227, lift the arms of the rock-shaft without thereby affecting the other lever—that is to say, one lever may stand with its short arm horizontal and its link in its lowermost position, as in the case of lever 226 in Fig. 32, while the other lever 223 may have its short arm elevated, thereby lifting the arms 218 and 219 and tripping or retracting the detent 212 without thereby affecting the companion lever 226.

The long arm of lever 223 has suspended from it a vertical rod 229, which passes through a hole in the end of said lever and is held by two collars 230, one above and the other below the lever, which collars are secured in place by set-screws. This arrangement permits the rod to be raised or lowered relatively to the lever, as may be desired. Similarly there is suspended from the long arm of lever 226 a rod 231, held by collars 232, which permit of adjustment of this rod. The lower ends of the rods 229 and 231, respectively, rest normally upon the wrapper-strips 10 and 12 and are by said strips supported or held up, as indicated in Fig. 31. Hence the long arms of the levers 223 and 226 cannot fall, and the detent or locking-bolt 212 cannot be thereby retracted. Should either wrapper-strip, however, be exhausted or should it break beyond the rod and be drawn from under the same through the action of the nippers, the rod being no longer supported and possessing weight sufficient to elevate the arm 218 or 219 would lift the horizontal arm of the elbow-lever 215, and thereby retract the locking-belt or detent 212. It will be seen that in thus acting each rod and its lever is independent of the other and that each will automatically throw the machine out of action whenever the paper upon which it bears is exhausted or withdrawn from beneath it. The troughs or channels through which the paper passes are of course provided with holes or openings beneath the rods 229 231, so that they may drop freely downward through the same.

When the paper is exhausted in the trough 93, which happens much more frequently than in the trough 94, since the inner wrapper is ordinarily drawn from a strip of great length, while the outer wrappers are usually cut from strips of moderate length, it is desirable to hold up the rod 231 during the introduction of a further strip and simultaneously to depress the stop pin or gage 69, which, as before explained, determines the precise point to which the forward or inner end of the new wrapper-strip 12 may be manually introduced. To accomplish this result, I arrange on the back face of cross-bar 123 a rock-shaft 233, having an arm 234, depending in the path of the swinging arm 98 of the spring tension or pressure device hereinbefore described. At the opposite end of the rock-shaft 233 there is an arm 235, the under face of which is rounded and which bears upon the head of stem 69, so that as the swinging arm 98 is thrown backward to relieve the tension-plate 95 of pressure and to permit introduction of the wrapper-strip 12 said pin or gage 69 is thereby simultaneously depressed and brought across the path of said strip, as indicated in Fig. 32. The rock-shaft 233 further carries a cam or arm 236, which, acting beneath a lever or bar 237, which encircles rod 231 and bears beneath a collar 238 thereon, serves to lift the rod 231, thereby elevating the long arm and depressing the short arm of lever 226. The slot in link 227 permits this depression of the short arm of the lever without interfering with or affecting the rock-shaft 217 or the parts connected therewith. By thus elevating the rod 231 it is prevented from interfering with the introduction of the strip 12, which it would do otherwise.

The rod 229, being near the operator and requiring to be lifted only at long intervals, is not provided with any special means for lifting it, but may be directly raised by hand on the rare occasions when this is necessary.

Motion is given to shaft 202 through its gear-wheel 203 and a pinion 239, carried by a shaft 240, which also carries a band-wheel 241. A belt passing about the wheel 241 imparts motion from any prime motor to the machine, subject, of course, to the clutching or unclutching of gear 203 and cone 204, as above explained.

Having thus described my invention, what I claim is—

1. A machine for wrapping merchandise, comprising the following elements: a pair of nippers for grasping an outer wrapper-sheet and moving the same longitudinally; a cutter for severing a wrapper-blank from said strip; a second pair of nippers for transferring the severed blank to the folding-point; a third pair of nippers for drawing an inner wrapper-strip longitudinally across the outer wrapper-strip; a cutter for severing a wrapper-blank from the inner wrapper-strip; means for delivering merchandise upon the superposed wrapper-blanks; and devices for folding said blanks about the merchandise, substantially as described.

2. In a machine for wrapping merchandise, the combination of a guide or holder to contain a wrapper-strip; a reciprocating nipper to draw said strip lengthwise a distance equal to one wrapper-blank; a cutter to sever a blank from the strip; and a second pair of nippers movable at right angles to the first to deliver the severed blank to the place of folding.

3. In a machine for wrapping merchandise, the combination of two guides or holders for wrapper-blanks; two pairs of nippers adapted to grasp and draw forward said blanks; cutters adapted to sever wrapper-blanks from the respective strips; and a third pair of nippers adapted to seize one of the severed blanks and to deliver it across the path of the other, whereby one blank is laid upon the other.

4. In a machine for wrapping merchandise, the combination of a pair of nippers for grasping an outer wrapper and moving the same in one direction; a second pair of nippers for moving said wrapper at an angle to the direction of its first movement and transferring the same to the folding-point; a third pair of nippers for drawing an inner wrapper across the outer wrapper; means for delivering merchandise upon the superposed wrappers; and devices for folding said wrappers about the merchandise, substantially as described.

5. In a machine for wrapping merchandise, the combination of a guide or holder to contain a wrapper; a reciprocating nipper to draw said wrapper therefrom; and a second pair of nippers movable at an angle to the first to deliver the wrapper to the place of folding.

6. In a machine for wrapping merchandise, the combination of two guides or holders for wrappers; two pairs of nippers adapted to grasp and draw forward said wrappers; and a third pair of nippers adapted to seize one of the wrappers and to deliver it across the path of the other, whereby one wrapper is laid upon the other.

7. In combination with nippers comprising two levers having jaws movable toward and from each other; means for longitudinally reciprocating said nippers; an elbow-lever having one arm extending across the movable member of the nippers, and adapted to bear thereon and thereby to close the jaws together; and a spring-pressed hook adapted when the jaws are thus closed to engage with and lock the movable member of the pincers.

8. In combination with pincers comprising fixed member 17 and movable member 18, elbow-lever 22 overhanging said movable member; means for rocking said elbow-lever; a hook or detent 20 adapted to engage the free end of the member 18; a spring 21 serving to draw the hook toward said member 18; and means for reciprocating the pincers.

9. In combination with the fixed member 17 and movable member 18 of a pair of pincers, the latter having its rear end made resilient and its extremity beveled, a locking-hook in plane with the movable member; a spring tending to draw the nose of the hook toward and against the beveled end of the movable member of the pincers, whereby said hook is caused to move said member and thereby to open or separate the jaws of the pincers; and means for reciprocating the pincers.

10. In combination with a fixed pincer member 17, a coacting movable member 18 having its rear arm or lever portion made elastic or resilient; a hook or detent 20 adapted when the member 18 is depressed and flexed, to engage the free end of said member; a spring acting upon the hook and serving to draw its free end against the beveled end of the member 18 when said member is released from the hook, whereby the lever member is rocked upon its pivot and caused to carry its jaw portion away from the jaw of the fixed member 17; and means for reciprocating the pincers.

11. In combination with pincers, comprising a fixed jaw 17 and a movable member 18; a hook or detent 20 movable bodily with the pincers; a spring for moving the hook normally toward the pincers; trip mechanism for disconnecting the hook from the pincers, said mechanism comprising levers 33 and 34, and a spring 35; and means for reciprocating the pincers.

12. In combination with pincers and with a hook or locking device therefor, a lever 33 pivoted between its ends, and having one end in the path of the reciprocating pincers or its slide; a second lever having one arm movable into and out of the path of travel of the hook or detent, and a second arm in contact with an arm of the lever 33; a spring 35 acting upon the lever 34 and tending normally to throw the same out of the path of the hook 20, said parts being constructed and arranged to operate substantially as described, whereby upon the backward movement of the pincers the lever 33 is acted upon by the pincers-carrying slide, and is caused to throw one arm of the lever 34 against the hook 20 and to withdraw it from engagement with the pincers; and means for reciprocating the pincers.

13. In combination with pincers having the fixed member 17, resilient movable member 18 and hook 20; elbow-lever 22; pendulous lever 24; connecting-link 25; and wheel 27 provided with lug 26 for actuating the elbow-lever, one of the members 18, 20, being beveled to permit the latter to be forced back by the former.

14. In combination with reciprocating pincers, comprising a fixed member and a resilient movable member; a hook or detent adapted to engage and positively lock said movable member and to hold the members in gripping relation; and a fixed stop located in the path of the hook or detent and serving to withdraw the same from engagement with the pincers as said pincers complete their forward movement, whereby the blank held by said pincers is released.

15. In a wrapping-machine, the combination of means for moving a wrapper strip or blank in one direction; and nippers or pincers for receiving and moving the strip or blank in a direction at an angle to that of its first movement, said nippers or pincers being provided with upper and lower jaws, the lower jaw having on its side face a projecting lip $18^b$, substantially as shown and described, to support the incoming strip and direct it properly between the nipper-jaws.

16. In combination with means for moving a wrapper strip or blank in one direction, pincers for moving the blank in a direction at an angle to its initial travel, said pincers having a lower jaw provided on its receiving side with a lip beveled or inclined downwardly toward its outer edge, substantially as described, whereby it is adapted to receive, support, and guide the incoming blank and insure its entrance between the pincer-jaws.

17. In combination with a trough or guide for a wrapper-strip, a hinged or pivoted tension-plate therein provided with a series of sockets or depressions at varying distances from the pivot-axis; a swinging arm movable over said plate; and a spring stem or plunger carried by said arm, and adapted to enter one or another of the sockets or depressions and thereby to apply pressure to the plate at different points relatively to the pivot-axis.

18. In combination with a trough or guide for wrapper-strips, a blade or cutter adapted to sever wrapper-blanks therefrom; a cross-head movable toward and from the wrapper-strip, and a spring-sustained stem or stop-pin carried by said cross-head, and adapted to be moved into the path of the wrapper-strip, substantially as and for the purpose set forth.

19. In combination with a trough or guide 93 to receive and guide a wrapper-strip, a reciprocating cross-head 42 movable toward and from the bed over which the wrapper-strip is traversed; and a stem or stop-pin 69 carried by said cross-head and provided with a lifting-spring, said stem adapted to be depressed into or across the path of travel of the strip, and to serve as a stop or gage to determine the point to which it may be advanced in the trough.

20. In combination with trough 93 and tension-plate 95, cross-head 42 provided with gage or stop pin 69; swinging arm 98; and rock-shaft 233 provided with arms 234 and 235, whereby the pin 69 is depressed when the arm 98 is swung backward to relieve the tension-plate from pressure.

21. In combination with driving-gear and clutch mechanism therefor, a trip-lever for unclutching the mechanism; a trip-rod 231 carried by said lever; a lifting-lever 237 for elevating said rod; a trough or guide for the wrapping-strip; a tension-plate lying in said trough; a swinging arm movable toward and from said plate, and provided with a spring plunger or stem; a reciprocating cross-head movable toward and from the wrapper-strip bed or support; a gage pin or stem 69 carried by said cross-head; and a rock-shaft 233 provided with arms 234, 235 and 236, said parts being constructed and arranged substantially as described, whereby movement of the arm 98 to relieve the tension-plate is caused to elevate the trip-lever, and to depress the gage-pin, substantially as set forth.

22. In a wrapping-machine, the combination of a magazine for containing the merchandise to be wrapped, said magazine comprising a base having an opening through which the merchandise may descend, a series of parallel vertical rods arranged on the several sides of the magazine-space, and a top frame open at one side, the rods being set away from the corners or angles of the base and top frame; and a delivery-slide movable through or across the base of the magazine and adapted to deliver merchandise from the lower end of the column in the magazine, all substantially as described.

23. In combination with a magazine open at its bottom, a reciprocating slide movable across the bottom space of the magazine and adapted to eject bodies therefrom; and a bridge or guide located at the delivery side of the magazine and provided with guide-arms extending beyond the bridge or supporting portion, substantially as shown, whereby the delivered bodies are guided to the point of folding and are prevented from returning with the ejecting-slide.

24. In combination with a magazine such as described, an ejecting-slide 106 movable across the base of the magazine; a spout or tube adapted to receive the wrapped packages, and the mouth of which constitutes a folding or wrapping chamber; and a bridge or guide, comprising arms 114 and bridge 115, located between the magazine and the mouth of the spout, and serving to support and guide the articles delivered from the magazine, and to prevent their return with the slide.

25. In combination with base-frame 14 of the magazine, and with ejecting-slide 106; bridge 115 located between the magazine and the folding-point, and having its upper surface ribbed, as and for the purpose described.

26. In combination with the base-frame 14 of the magazine, and with ejecting-slide 106; guide-arms 114 extending from the delivery side of the magazine outward past the ends of the folding or wrapping chamber, said arms being brought to a sharp edge at their lower sides, substantially as and for the purpose set forth.

27. In combination with a magazine and an ejecting-slide constructed and operating substantially as set forth, a combined guide and bridge 114, 115; and means substantially such as described and shown for moving the same to a horizontal position and withdrawing it therefrom.

28. In combination with a bed or table having an opening for the reception of the wrapped parcels, a magazine; an ejecting-slide; and an intermediate guide and bridge provided with arms 114 to guide the merchandise in its passage from the magazine to the opening in the table, and with a supporting-surface 115 forming a continuation of the bottom of the magazine, and constituting a stop in front of which the delivered goods fall and by which they are prevented from moving backward with the delivery-slide.

29. In combination with a bed or table having an opening to receive packages; means for delivering a wrapper over or across said opening; feed devices for delivering merchandise to or upon said wrapper, prior to folding the latter; a reciprocating head or plunger for forcing said merchandise and wrapper into or through the opening and thereby performing a partial folding of the wrapper about the merchandise; and a presser-finger other than the head or plunger, adapted to bear upon and hold down the merchandise while said presser-head or plunger recedes.

30. In combination with a bed or table having an opening to receive packages; means for delivering a wrapper over or across said opening; feed devices for delivering merchandise to or upon said wrapper while the latter lies flat upon the bed; a reciprocating head or plunger for forcing said merchandise and wrapper into or through the opening and thereby partially folding the wrapper about the merchandise; a presser-finger adapted to bear upon and hold down the merchandise while the presser-head recedes; and slides for turning the wrapper inward upon the merchandise.

31. In combination with a bed or table having an opening to receive packages; means for delivering wrappers over or across said opening; feed devices for delivering merchandise to or upon said wrappers while the latter lie flat upon the bed; a reciprocating head or plunger for forcing said merchandise and wrappers into or through the opening and thereby partially folding the wrappers about the merchandise; a presser-finger adapted to bear upon and hold down the merchandise while the presser-head recedes; folders for turning in the edges or ends of the wrappers and laying them upon the merchandise; and means, substantially as described, for independently actuating the reciprocating head or plunger and the presser-finger, and causing them to approach and recede from the merchandise at proper times.

32. In combination with a bed or table provided with an opening to receive wrapped packages, and with means for delivering wrappers to or across said opening; feed devices for delivering merchandise to said wrappers; a reciprocating head provided with spring toes or fingers to bear upon and hold the wrappers; a head or plunger adapted to bear upon and to force the merchandise into or through the opening; a presser-finger adapted to bear upon and hold down the merchandise while the reciprocating heads or plungers rise; and means substantially as described for imparting the proper motions to said parts.

33. The combination in a wrapping machine, of a bed or table provided with an opening to receive the wrapped packages; a reciprocating cross-head 90; a second cross-head 135 movable within and relatively to the first cross-head; a presser-slide or finger 145 movable in and relatively to the cross-head 135; and means substantially as described for reciprocating the several cross-heads, as and for the purpose set forth.

34. In combination with the cross-bar 123, having bearing-face 124, and guide-ears 127; cross-head 90 provided with rods 125 and 137; cross-head 135 having ears 136 to encircle the guide-rods 137, and provided with guides or ways; presser slide or finger 145 movable in said guides or ways; and means substantially such as described for reciprocating said slides independently of one another.

35. In a wrapping-machine, the combination with a bed or support, having an opening therein; means for delivering merchandise to or over said opening; a reciprocating plunger 135 movable toward and from said opening; a slide 145 movable within and relatively to said plunger; and means for actuating said slide, comprising cross-head 90, rock-shafts 130, 139 and 153, levers actuated by said rock-shafts, and cams for rocking said shafts, all substantially as described and shown.

36. In a wrapping-machine, the combination of a bed or table having an opening or chamber to receive a wrapper and merchandise to be wrapped; a presser-head or plunger for forcing the merchandise and wrapper into said opening or chamber; slides 173, 174, 185 and 191 adapted to be moved at different times to and from positions over said opening or chamber; a presser-finger 145 for holding down the merchandise within the opening or chamber; and means, substantially as described, for moving the several slides and the presser-finger, substantially in the manner and at the times set forth, whereby the merchandise is held in place while the wrapper-flaps are folded over and the holding-finger is moved out of the way of the folders.

37. In a machine for wrapping merchandise, the combination of a guide or holder adapted to contain a wrapper strip or blank having a gummed and an ungummed edge at opposite sides; nippers adapted to grasp an ungummed portion of the wrapper strip or blank and to draw the strip forward; and a moistening device out of line with the nippers and in the path of an ungummed portion of the strip, adapted to apply moisture to the ungummed edge of said strip, the parts being constructed and arranged substantially as described, whereby the gummed portion of the strip is kept dry during the feed of the strip by the nippers and contact of the gummed portion with the mechanism of the wrapping machine is prevented.

38. In combination with a trough or guide adapted to receive and hold a wrapper-strip or blank gummed at one edge and ungummed at the opposite edge and to permit movement of said blank through it in the direction of the length of the gummed surface; nippers movable toward and from the delivery end of said trough or guide, adapted to seize an ungummed portion of the blank and to draw said blank from the trough or guide; and a moistening-roller lying in the path of the advancing strip but out of line with the gummed portion thereof, whereby said roller is adapted to moisten the ungummed edge of the blank as the latter is moved outward by the nippers.

39. In combination with means for feeding a wrapper-strip; a tank or holder for containing moistening liquid; a roller partially immersed in said liquid; a second roller resting upon the first and lying in the path of the advancing strip, adapted to be rotated by said strip and to apply moisture thereto; and a third roller above the second, serving to press and hold the wrapper-strip in contact with the second or moistening roller.

40. In combination with means for advancing a wrapper-strip; an elevated reservoir to contain moistening liquid; a second tank or holder communicating with the main reservoir by a pipe or conduit; means for regulating and limiting the flow of liquid to the secondary tank or holder; a roller contained within the secondary tank; an outlet or overflow located slightly below the top of said roller; a second roller bearing upon the first and extending into the path of the incoming strip; and means for holding said strip in contact with the upper roller, all substantially as described and shown.

41. In a wrapping-machine, a strip-moistening apparatus, comprising a tank or holder, an absorbent roller dipping into the liquid of the tank, and a non-absorbent roller lying above and bearing at all times upon the absorbent roller and extending into the path of the advancing strip, whereby the absorbent roller is kept constantly saturated and the non-absorbent roller is adapted to receive and carry to the wrapper-strip a limited and uniform quantity of moisture.

42. In a wrapping-machine, the combination of a liquid-holder; a felt roller dipping into the liquid of said holder; a rubber roller making contact with said felt roller; and a metal roller lying above the rubber roller and serving to press in contact therewith the wrapper-strip passing between them.

43. In a machine for wrapping gum, chocolate and other substances containing sugar, feeding-slides and surfaces formed of German silver in those parts subject to contact with the substances fed and delivered, as and for the purpose set forth.

44. In combination with a wrapping-machine, a clutch mechanism 203,204 interposed between the wrapping mechanism and the prime motor; a shipping-yoke 207 carried by a rock-shaft 208 and serving to couple and uncouple the clutch; a hand-lever 211 connected with said rock-shaft and serving to unclutch said parts; a locking device 212 serving to engage the hand-lever and hold the parts in locking engagement; elbow-lever 215 for retracting said locking-bolt; rock-shaft 220 having an arm connected with said elbow, lever; a lever connected at one end with said rock-shaft and carrying at its opposite end a rod or stem which normally rests upon the wrapper-strip in the guide or trough, but which when unsupported by said strip will descend and through the described connections retract the locking-bolt.

In testimony whereof I have signed my name to this specification in the presence of two subscribing witnesses.

THOS. ADAMS, Sr.

Witnesses:
ADOLP BAYLER,
WILLIAM W. DODGE.